US012758958B2

(12) United States Patent
Losego et al.

(10) Patent No.: US 12,758,958 B2
(45) Date of Patent: Oct. 13, 2026

(54) IMMOBILIZATION OF MOLECULAR CATALYSTS ON SOLID POWDERS VIA VAPOR DEPOSITION OF ENCAPSULATING NANO-LAYERS FOR USE AS HETEROGENEOUS CHEMICAL CATALYSTS

(71) Applicants: Georgia Tech Research Corporation, Atlanta, GA (US); University of South Carolina, Columbia, SC (US)

(72) Inventors: Mark D. Losego, Atlanta, GA (US); Aaron K. Vannucci, Columbia, SC (US)

(73) Assignees: GEORGIA TECH RESEARCH CORPORATION, Atlanta, GA (US); UNIVERSITY OF SOUTH CAROLINA, Columbia, SC (US)

( * ) Notice: Subject to any disclaimer, the term of this patent is extended or adjusted under 35 U.S.C. 154(b) by 469 days.

(21) Appl. No.: 18/379,939

(22) Filed: Oct. 13, 2023

(65) Prior Publication Data

US 2024/0149262 A1 May 9, 2024

Related U.S. Application Data

(60) Provisional application No. 63/379,297, filed on Oct. 13, 2022.

(51) Int. Cl.
*B01J 37/02* (2006.01)
*B01J 21/08* (2006.01)
(Continued)

(52) U.S. Cl.
CPC ........... *B01J 37/0215* (2013.01); *B01J 21/08* (2013.01); *B01J 31/1616* (2013.01); *B01J 31/183* (2013.01); *B01J 35/19* (2024.01)

(58) Field of Classification Search
CPC ...... B01J 21/08; B01J 23/755; B01J 31/1616; B01J 31/1815; B01J 31/183; B01J 35/19; B01J 35/395; B01J 37/0209; B01J 37/0215; B01J 2231/4211; B01J 2235/00; B01J 2531/0241; B01J 2531/847; B01J 2540/12; B01J 2540/66; B01J 2540/68
See application file for complete search history.

(56) References Cited

FOREIGN PATENT DOCUMENTS

CN 109718855 A * 5/2019 ............. B01J 31/22

OTHER PUBLICATIONS

WIPO Machine Translation of Qin et al (CN109718855) (Year: 2019).*

* cited by examiner

*Primary Examiner* — Brian A McCaig
(74) *Attorney, Agent, or Firm* — TROUTMAN PEPPER LOCKE LLP; Ryan A. Schneider; Emily M. Tarsis

(57) ABSTRACT

An exemplary embodiment of the present disclosure provides a heterogeneous chemical catalyst comprising a substrate, a molecule attached to the substrate via a binding site, wherein the molecule comprises a catalytic active site, and a coating layer coating at least a portion of the binding site. Another embodiment of the present disclosure provides a method of preparing a heterogeneous chemical catalyst. This method comprises providing a substrate, attaching a molecule to the substrate via a binding site, wherein the molecule comprises a catalytic active site, and coating, with a coating layer, at least a portion of the binding site to form the heterogeneous chemical catalyst.

19 Claims, 19 Drawing Sheets

(51) Int. Cl.

| | |
|---|---|
| ***B01J 31/16*** | (2006.01) |
| ***B01J 31/18*** | (2006.01) |
| ***B01J 35/00*** | (2006.01) |

| Cat | Yield |
| --- | --- |
| 1 | 0% |
|  1\|$SiO_2$ | 5% |
|  1\|$SiO_2$ with 0.5 nm $TiO_2$ALD | 32% |
|  1\|$SiO_2$ with 1.0 nm $TiO_2$ALD (1\|$SiO_2$\|$TiO_2$) | 90% |
|  1\|$SiO_2$ with 1.5 nm $TiO_2$ALD | 2% |

IMMOBILIZATION OF MOLECULAR CATALYSTS ON SOLID POWDERS VIA VAPOR DEPOSITION OF ENCAPSULATING NANO-LAYERS FOR USE AS HETEROGENEOUS CHEMICAL CATALYSTS

CROSS-REFERENCE TO RELATED APPLICATIONS

This application claims the benefit of U.S. Provisional Application Ser. No. 63/379,297, filed on Oct. 13, 2022, which is incorporated herein by reference in its entirety as if fully set forth below.

FIELD OF THE DISCLOSURE

The various embodiments of the present disclosure relate generally to immobilization of molecular catalysts on solid powders via vapor deposition of encapsulating nano-layers for use as heterogeneous chemical catalysts.

BACKGROUND

Molecular transition metal catalysts in homogeneous solutions tend to exhibit high catalytic activity and reaction selectivity, but also exhibit poor stability and short lifetimes. One major pathway to molecular catalyst deactivation is the formation of off-cycle intermediates via intermolecular catalyst interactions. While catalyst dimers or trimers are sometimes necessary for catalytic activity most catalyst "multi"-mers result in catalytic dead ends. Multimer formation is often promoted by water in the reaction solution, as shown in FIG. 1A, thus limiting the ability to utilize highly environmentally safe solvents. One common approach to minimizing intermolecular catalyst interactions is to perform catalytic reactions under very low catalyst loadings. This approach has led to impressively high initial turnover frequencies (TOFs) but often times does not appreciably increase catalyst lifetimes.

The immobilization of molecular catalysts onto solid supports is an approach designed towards preventing intermolecular catalyst interactions and extending molecular catalysts lifetimes. The isolation of molecular catalysts on solid supports inhibits bimolecular catalyst interactions and thus takes advantage of the inherent catalyst activity. This approach of creating a molecular/heterogeneous catalyst has the added benefits of increased solvent compatibility, increased ease of catalyst separation from reaction mixtures, possible incorporation into flow reactors, and potential for catalyst recycling. This approach, however, can have its own set of drawbacks including increased cost of catalyst synthesis, possible decreases in catalyst selectivity, and difficulty in preventing catalyst leaching from the solid support. The increased cost of both the materials and catalyst preparation can be overcome by achieving previously unattainable reactivity through extending catalyst lifetimes and recyclability.

Extensive research has been reported on immobilized catalysts in the field of surface organometallic chemistry (SOMC). This approach generates individual catalyst molecules on solid oxide supports through direct binding of transition metals to the oxide supports. This binding occurs after a thorough preparation of the oxide surface to create sites capable of strong binding to individual metal atoms. The metal atoms that bind the oxide support can be introduced to the support through solution phase chemistry. Many of these SOMC catalysts are composed of early transition metals due to their oxophilicity, but recent reports have extended SOMC to the late transition metals. An impressive array of catalytic transformations has been achieved with this class of SOMC catalyst. Similar to polymer-supported catalysts, SOMC catalysts utilize the support as a ligand for the catalysts, therefore, there is no direct analogous homogeneous catalysts for comparison. Iterative design of SOMC catalysts, hence, cannot directly benefit from homogeneous catalyst studies.

Ligand-first binding of molecular catalysts to a support is an alternative approach to catalyst immobilization on solid metal oxides that could benefit from previous understandings of homogeneous catalysis. The ligand-first class of molecular/heterogeneous catalysts on oxide supports is inspired by the design of dye sensitized solar cells and electrocatalysis. In this approach catalytic activity and selectivity of homogeneous catalyst can often be translated to the molecular/heterogeneous system. Furthermore, the lifetimes of homogeneous catalysts that rapidly deactivate in solution through bimolecular routes such as dimerization, may have their lifetimes greatly enhanced by isolation on a solid support as illustrated in FIG. 1B. However, detachment of ligand-first molecules from metal oxide supports remains a problem. Detachment, or leaching, of the molecular catalysts into solution is typically promoted by water or highly polar organic solvents disrupting the ligand binding to the support. Metal oxide supports can even accelerate decomposition and nanoparticle formation of leached molecular catalysts. Many strategies for increasing the binding strength between molecular catalysts and metal oxide surfaces have been explored. While these binding motifs have been successful to varying degrees, most still have limited stability under reaction conditions, especially in the presence of water.

The present disclosure is directed to overcoming limitations in the art.

BRIEF SUMMARY

An exemplary embodiment of the present disclosure provides a heterogeneous chemical catalyst comprising a substrate, a molecule attached to the substrate via a binding site, wherein the molecule comprises a catalytic active site, and a coating layer coating at least a portion of the binding site.

In any of the embodiments disclosed herein, the coating layer can adhere the molecule to the substrate.

In any of the embodiments disclosed herein, the coating layer can be a vapor deposited coating layer.

In any of the embodiments disclosed herein, the binding site can comprise a linking group, wherein the linking group couples the substrate to the molecule.

In any of the embodiments disclosed herein, the coating layer can coat the entirety of the linking group.

In any of the embodiments disclosed herein, the linking group can be selected from the group consisting of —COOH, $—PO_3H_2$, $—SO_3H$, $—OPO_3H$, $—OSO_3H$, C(O)NHOH, silatranes, silanes, siloxanes, disulfides, and thiols.

In any of the embodiments disclosed herein, the coating layer can have a thickness of between about 0.1 nm and about 10 nm.

In any of the embodiments disclosed herein, the coating layer can coat the binding site, such that the catalytic active site is exposed.

In any of the embodiments disclosed herein, the substrate can comprise one or more compounds selected from the group consisting of silicon oxide, titanium oxide, aluminum oxide, zirconium oxide, nickel oxide, zinc oxide, niobium oxide, chromium oxide, hafnium oxide, lanthanum oxide, yttrium oxide, cerium oxide, tantalum oxide, magnesium oxide, strontium oxide, calcium oxide, indium oxide, tin doped indium oxide, tin oxide, fluorine doped tin oxide, copper oxide, cobalt oxide, iron oxide, and mixtures thereof.

In any of the embodiments disclosed herein, the molecule can comprise one or more transition metal coordination complexes.

In any of the embodiments disclosed herein, the coating layer can comprise one or more compounds selected from the group consisting of metal oxides, metal oxyhydroxides, metal hydroxides, metal nitrides, metal carbides and their compounds, including aluminum oxide, titanium oxide, hafnium oxide, zirconium oxide, zinc oxide, silicon oxide, magnesium oxide, calcium oxide, strontium oxide, barium oxide, vanadium oxide, chromium oxide, manganese oxide, iron oxide, cobalt oxide, nickel oxide, copper oxide, niobium oxide, molybdenum oxide, ruthenium oxide, indium oxide, tin oxide, bismuth oxide, lead oxide, Lanthanum oxide, tantalum oxide, tungsten oxide, cerium oxide, neodymium oxide, europium oxide, ytterbium oxide, dysprosium oxide, and their solid solutions and multicomponent compounds.

In any of the embodiments disclosed herein, the heterogeneous chemical catalyst can be suspended in a polar protic, polar, or protic solvent.

Another embodiment of the present disclosure provides a method of preparing a heterogeneous chemical catalyst. This method comprises providing a substrate, attaching a molecule to the substrate via a binding site, wherein the molecule comprises a catalytic active site, and coating, with a coating layer, at least a portion of the binding site to form the heterogeneous chemical catalyst.

In any of the embodiments disclosed herein, coating the at least a portion of the binding site can comprise one or more cycles of a vapor deposition process that undergoes self-limiting sequential reactions.

In any of the embodiments disclosed herein, the method can further comprise suspending the heterogeneous chemical catalyst in a polar protic, polar, or protic solvent to undergo a chemical reaction.

In any of the embodiments disclosed herein, the chemical reaction can be a coupling reaction.

In any of the embodiments disclosed herein, coating the at least a portion of the binding site can leave the catalytic active site exposed. These and other aspects of the present disclosure are described in the Detailed Description below and the accompanying drawings. Other aspects and features of embodiments will become apparent to those of ordinary skill in the art upon reviewing the following description of specific, exemplary embodiments in concert with the drawings. While features of the present disclosure may be discussed relative to certain embodiments and FIGURES, all embodiments of the present disclosure can include one or more of the features discussed herein. Further, while one or more embodiments may be discussed as having certain advantageous features, one or more of such features may also be used with the various embodiments discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

FIG. 1A provides an example of molecular nickel catalyst deactivation in homogeneous solution. FIG. 1B depicts molecular catalyst (1) loaded onto a $SiO_2$ support susceptible to desorption and subsequent deactivation. FIG. 1C illustrates an embodiment of the present disclosure employing stabilization of a molecular catalyst with an ALD encapsulation layer.

FIG. 3A provides XRD data for 1|$SiO_2$, 1|$SiO_2$|$TiO_2$ pre-reaction, and 1|$SiO_2$|$TiO_2$ post-reaction. All three patterns show the amorphous silica support without any evidence for nickel nanoparticles.

FIG. 5 more clearly shows Ni signal in comparison to FIG. 2, and FIG. S3 also confirms the presence of titania coating. This is consistent with ICPMS, found in Table 2.

FIG. 6 shows that Ni is still present on the hybrid catalyst powder, consistent with ICPMS in Table 2. Additionally, K and P signals are present, and their presence can be attributed to residual $K_3PO_4$, from the buffer used in the catalytic reactions (see Table 1 and Table 2).

DETAILED DESCRIPTION

To facilitate an understanding of the principles and features of the present disclosure, various illustrative embodiments are explained below. The components, steps, and materials described hereinafter as making up various elements of the embodiments disclosed herein are intended to be illustrative and not restrictive. Many suitable components, steps, and materials that would perform the same or similar functions as the components, steps, and materials described herein are intended to be embraced within the scope of the disclosure. Such other components, steps, and materials not described herein can include, but are not limited to, similar components or steps that are developed after development of the embodiments disclosed herein.

Figure 1A:
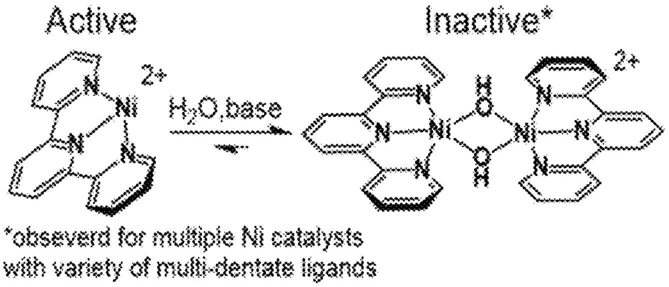
FIGS. 1A-C provide a comparison of conventional methods to exemplary embodiments of the present disclosure.
Figure 1B:
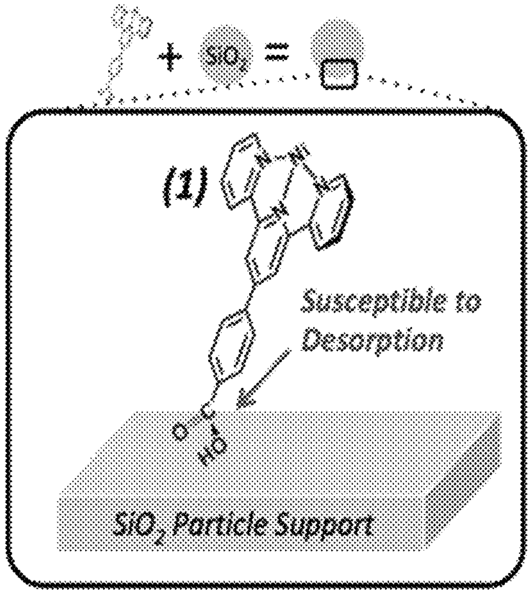
Figure 1C:
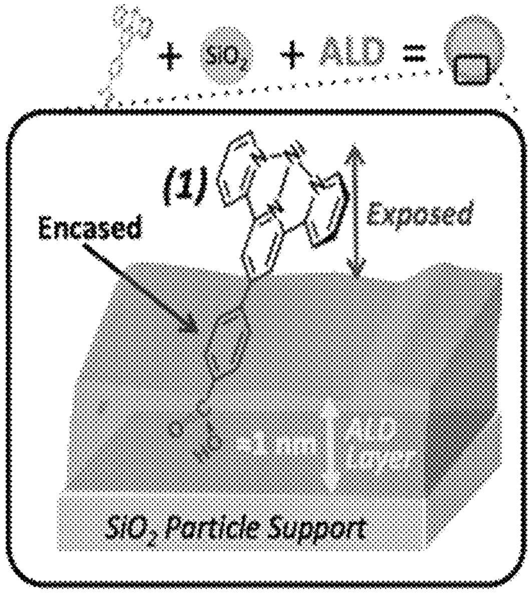

Herein are described potentially universal methods for reliably attaching and isolating molecular catalysts ligand-first to solid metal oxide supports for solution-based chemical catalysis. This paradigm can use atomic layer deposition (ALD) to physically encapsulate pre-bound molecular catalysts to solids including metal oxide powders. ALD can allow for precise control of oxide layer growth and has been used to isolate single-site heterogeneous catalysts (Liu et al., "Stabilizing Single-Atom and Small-Domain Platinum via Combining Organometallic Chemisorption and Atomic Layer Deposition," *Organometallics,* 36:818-828 (2017); Lu et al., "Atomic Layer Deposition Overcoating Improves Catalyst Selectivity and Longevity in Propane Dehydrogenation," *ACS Catal.,* 10:13957-13967 (2020)). As shown in FIG. 1C, this precise control can allow for encasing the hybrid catalyst binding sites while leaving the catalyst active site exposed to solvent and substrate. The ALD layer thus can immobilize and strongly adhere the molecular catalyst onto the solid oxide support. This immobilization can generate a hybrid single molecule catalyst and allow for the use of green, polar solvents, such as water. Cross-coupling reactivity with nickel catalysts in water has been achieved with the addition of micelles in the reaction solution (Handa et al., "Nanonickel-Catalyzed Suzuki-Miyaura Cross-Couplings in Water," *Angew. Chem. Int. Ed.,* 54:11994-11998 (2015); Lipshutz, "When Does Organic Chemistry Follow Nature's Lead and "Make the Switch"?," *J. Org. Chem.,* 82:2806-2816 (2017)). In addition, this approach can allow for the use of nickel-based catalysts for reactions that are typically performed by palladium (Jana et al., "Advances in Transition Metal (Pd,Ni,Fe)-Catalyzed Cross-Coupling Reactions Using Alkyl-organometallics as Reaction Partners," *Chem. Rev.,* 111:1417-1492 (2011); Gildner and Colacot, "Reactions of the 21st Century: Two Decades of Innovative Catalyst Design for Palladium-Catalyzed Cross-Couplings," *Organometallics,* 34:5497-5508 (2015)). Both the ACS Pharmaceutical Round Table and the Green Chemistry Institute have called for increased use of nickel catalysts in cross-coupling reactions (Bryan et al., "Key Green Chemistry Research Areas from a Pharmaceutical Manufacturers' Perspective Revisited," *Green Chem.,* 20:5082-5103 (2018)), however, nickel catalysts are not being widely employed in the fine chemical industry (Jo et al., "Metal Speciation in Pharmaceutical Process Development: Case Studies and Process/Analytical Challenges for a Palladium-Catalyzed Cross-Coupling Reaction," *Organometallics,* 38:185-193 (2019)). Controlled reactivity, catalyst stability, and batch-to-batch consistency of nickel catalysts is still lacking. Often nickel catalysts exhibit a high degree of sensitivity to the choice of solvent, base, moisture levels, and substrates employed during coupling reactions. The ALD immobilization of molecular nickel catalysts onto solid supports has been designed to overcome these shortcomings and create a general catalyst motif for use in fine chemical synthesis.

This approach builds upon the inventors prior work that used ALD to attach active molecular photosensitizers to nanostructured electrodes for photoelectrochemical devices (Vannucci et al., "Crossing the Divide Between Homogeneous and Heterogeneous Catalysis in Water Oxidation,"

*Proc. Natl. Acad. Sci.*, 110:20918-20922 (2013); Hanson et al., "Stabilizing Small Molecules on Metal Oxide Surfaces Using Atomic Layer Deposition," *Nano Lett.*, 13:4802-4809 (2013); Hanson et al., "Stabilization of $[Ru(bpy)_2(4,4'-(PO_3H_2)bpy)]^{2+}$ on Mesoporous $TiO_2$ with Atomic Layer Deposition of $Al_2O_3$," *Chem. Mater.*, 2013, 25:3-5 (2013); Kim et al., "Stabilizing Chromophore Binding on TiO2 for Long-Term Stability of Dye-Sensitized Solar Cells Using Multicomponent Atomic Layer Deposition," *PCCP*, 16:8615-8622 (2014)). However, in those systems, device performance typically required careful design of ALD encapsulation layers that permitted proper electron transfer between molecule and oxide support. For chemical catalysis, this requirement is no longer necessary, simplifying the design. Moreover, as shown here, attachment of molecular catalysts to solid supports can lead to new reactivity not seen under homogeneous conditions. Most approaches to molecular catalyst immobilization involve developing, or taking from literature, successful homogeneous catalysts and attempting to adapt them for use as immobilized catalysts on heterogeneous supports. Poor homogeneous catalysts, however, are rarely considered for immobilization. Many poor homogeneous catalysts only suffer from very short catalyst lifetimes due to being susceptible to the catalyst deactivation pathways discussed above (e.g., dimerization). Deactivation through routes such as dimerization should be less likely, or even completely prevented when catalysts are immobilized. Herein, it is shown that immobilization via ALD of a poor homogeneous molecular catalyst can significantly extend its lifetime as a hybrid heterogeneous catalyst for chemical synthesis. Thus, using ALD to create hybrid catalysts via immobilization of molecular catalysts without concern for their homogeneous reactivity opens anew approach and chemical space for catalyst discovery. As a demonstration, herein, the design and synthesis of a hybrid nickel catalyst using ALD is reported, the synthesis steps with spectroscopic techniques are characterized, and proof-of-concept Suzuki cross-coupling reactions are shown to illustrate consistent catalytic activity in green solvents with high aqueous content.

An exemplary embodiment of the present disclosure provides a heterogeneous chemical catalyst comprising a substrate, a molecule attached to the substrate via a binding site, wherein the molecule comprises a catalytic active site, and a coating layer coating at least a portion of the binding site.

In some embodiments, the substrate comprises one or more metal oxides. For example, in some embodiments, the substrate comprises one or more compounds selected from the group consisting of silicon oxide, titanium oxide, aluminum oxide, zirconium oxide, nickel oxide, zinc oxide, niobium oxide, chromium oxide, hafnium oxide, lanthanum oxide, yttrium oxide, cerium oxide, tantalum oxide, magnesium oxide, strontium oxide, calcium oxide, indium oxide, tin doped indium oxide, tin oxide, fluorine doped tin oxide, copper oxide, cobalt oxide, iron oxide, and mixtures thereof.

In some embodiments, the molecule comprises one or more transition metal coordination complexes. For example, in some embodiments the molecule comprises nickel coordination complexes, palladium coordination complexes, or ruthenium coordination complexes.

In some embodiments, the binding site comprises a linking group, wherein the linking group couples the substrate to the molecule. For example, in some embodiments, the linking group is selected from the group consisting of $-COOH$, $-PO_3H_2$, $-SO_3H$, $-OPO_3H$, $-OSO_3H$, C(O)NHOH, silatranes, silanes, siloxanes, disulfides, and thiols.

In some embodiments, the coating layer adheres the molecule to the substrate. In some embodiments, the coating layer coats the entirety of the linking group. In some embodiments, the coating layer coats the binding site, such that the catalytic active site is exposed. The catalytic active site is the portion of the molecule attached to the substrate that interacts with reactants in solution to promote a particular chemical reaction. In some embodiments, the chemical reaction is a Suzuki-Miyaura coupling reaction. In some embodiments, the chemical reaction is a hydrodeoxygenation. In some embodiments, the chemical reaction is a hydrogenation. As disclosed herein, the term "exposed" means that the catalytic active site is capable of interacting with reactants in liquid solution. In some embodiments, at least 10% to 99% of the catalytic active site is exposed. For example, in some embodiments at least 10% to 25%, at least 10% to 50%, at least 10% to 75%, at least 10% to 99%, at least 20% to 25%, at least 20% to 50%, at least 20% to 75%, at least 20% to 99%, at least 30% to 50%, at least 30% to 75%, at least 30% to 99%, at least 40% to 50%, at least 40% to 75%, at least 40% to 99%, at least 50% to 55%, at least 50% to 60%, at least 50% to 65%, at least 50% to 70%, at least 50% to 75%, at least 50% to 80%, at least 50% to 85%, at least 60% to 65%, at least 60% to 70%, at least 60% to 75%, at least 60% to 80%, at least 60% to 85%, at least 60% to 90%, at least 70% to 75%, at least 70% to 80%, at least 70% to 85%, at least 70% to 90%, at least 80% to 85%, at least 80% to 90%, or at least 85% to 90%.

In some embodiments, the coating layer is a vapor deposited coating layer. In some embodiments, the coating layer has a thickness of between about 0.1 nm and about 10 nm. For example, in some embodiments the coating layer has a thickness of between about 0.1 nm and about 1 nm, about 0.1 nm and about 2 nm, about 0.1 nm and about 3 nm, about 0.1 nm and about 4 nm, about 0.1 nm and about 5 nm, about 0.1 nm and about 6 nm, about 0.1 nm and about 7 nm, about 0.1 nm and about 8 nm, about 0.1 nm and about 9 nm, about 0.5 nm and about 1 nm, about 0.5 nm and about 2 nm, about 0.5 nm and about 3 nm, about 0.5 nm and about 4 nm, about 0.5 nm and about 5 nm, about 0.5 nm and about 6 nm, about 0.5 nm and about 7 nm, about 0.5 nm and about 8 nm, about 0.5 nm and about 9 nm, about 0.5 nm and about 10 nm, about 1 nm and about 2 nm, about 1 nm and about 3 nm, about 1 nm and about 4 nm, about 1 nm and about 5 nm, about 1 nm and about 6 nm, about 1 nm and about 7 nm, about 1 nm and about 8 nm, about 1 nm and about 9 nm, about 1 nm and about 10 nm, about 1.5 nm and about 2 nm, about 1.5 nm and about 3 nm, about 1.5 nm and about 4 nm, about 1.5 nm and about 5 nm, about 1.5 nm and about 6 nm, about 1.5 nm and about 7 nm, about 1.5 nm and about 8 nm, about 1.5 nm and about 9 nm, about 1.5 nm and about 10 nm, about 2 nm and about 3 nm, about 2 nm and about 4 nm, about 2 nm and about 5 nm, about 2 nm and about 6 nm, about 2 nm and about 7 nm, about 2 nm and about 8 nm, about 2 nm and about 9 nm, about 2 nm and about 10 nm, about 2.5 nm and about 3 nm, about 2.5 nm and about 4 nm, about 2.5 nm and about 5 nm, about 2.5 nm and about 6 nm, about 2.5 nm and about 7 nm, about 2.5 nm and about 8 nm, about 2.5 nm and about 9 nm, about 2.5 nm and about 10 nm, about 3 nm and about 4 nm, about 3 nm and about 5 nm, about 3 nm and about 6 nm, about 3 nm and about 7 nm, about 3 nm and about 8 nm, about 3 nm and about 9 nm, about 3 nm and about 10 nm, about 3.5 nm and about 4 nm, about 3.5 nm and about 5 nm, about 3.5 nm and about 6 nm, about 3.5 nm and about 7 nm, about 3.5 nm and about 8 nm, about 3.5 nm and about 9 nm, about 3.5 nm and about 10 nm, about 4 nm and about 5 nm, about 4 nm and about 6 nm, about 4 nm and about 7 nm, about 4 nm and about 8 nm, about 4 nm and about 9 nm, about 4 nm and about 10 nm, about 5 nm and about 6 nm, about 5 nm and about 7 nm, about 5 nm and about 8 nm, about 5 nm and about 9 nm, about 5 nm and about 10 nm, about 6 nm and about 7 nm, about 6 nm and about 8 nm, about 6 nm and about 9 nm, about 6 nm and about 10 nm, about 7 nm and about 8 nm, about 7 nm and about 9 nm, or about 7 nm and about 10 nm.

In some embodiments, the coating layer comprises one or more compounds selected from the group consisting of metal oxides, metal oxyhydroxides, metal hydroxides, metal nitrides, metal carbides and their compounds, including aluminum oxide, titanium oxide, hafnium oxide, zirconium oxide, zinc oxide, silicon oxide, magnesium oxide, calcium oxide, strontium oxide, barium oxide, vanadium oxide, chromium oxide, manganese oxide, iron oxide, cobalt oxide, nickel oxide, copper oxide, niobium oxide, molybdenum oxide, ruthenium oxide, indium oxide, tin oxide, bismuth oxide, lead oxide, Lanthanum oxide, tantalum oxide, tungsten oxide, cerium oxide, neodymium oxide, europium oxide, ytterbium oxide, dysprosium oxide, and their solid solutions and multicomponent compounds.

In some embodiments, the heterogeneous chemical catalyst is suspended in a polar protic, polar, or protic solvent. For example, in some embodiments the solvent is water, ethanol, methanol, isopropanol, 1,4-dioxane, acetonitrile, dichloromethane, tetrahydrofuran, acetic acid, dimethylformamide, ethyl acetate, or mixtures thereof. In some embodiments, the heterogeneous chemical catalyst is suspended in a non-polar solvent. For example, in some embodiments the solvent is pentane, hexane, heptane, octane, decane, undecane, dodecane, or mixtures thereof.

Another embodiment of the present disclosure provides a method of preparing a heterogeneous chemical catalyst. This method comprises providing a substrate, attaching a molecule to the substrate via a binding site, wherein the molecule comprises a catalytic active site, and coating, with a coating layer, at least a portion of the binding site to form the heterogeneous chemical catalyst.

In carrying out the method of preparing a heterogeneous chemical catalyst, the resulting catalyst can have the various characteristics described above.

In some embodiments of the method, the coating at least a portion of the binding site comprises one or more cycles of a vapor deposition process that undergoes self-limiting sequential reactions. For example, in some embodiments the coating comprises 1 to 5 cycles, 1 to 10 cycles, 1 to 15 cycles, 1 to 20 cycles, 5 to 10 cycles, 5 to 15 cycles, 5 to 20 cycles, 10 to 15 cycles, 10 to 20 cycles, or 15 to 20 cycles of a vapor deposition process that undergoes self-limiting sequential reactions. In some embodiments, the vapor deposition process is atomic layer deposition.

In some embodiments, the method further comprises suspending the heterogeneous chemical catalyst in a polar protic, polar, or protic solvent to undergo a chemical reaction. For example, in some embodiments, the solvent is water, ethanol, methanol, isopropanol, acetonitrile, dichloromethane, tetrahydrofuran, acetic acid, dimethylformamide, ethyl acetate, or mixtures thereof. In some embodiments, the heterogeneous chemical catalyst is suspended in a non-polar solvent. For example, in some embodiments the solvent is pentane, hexane, heptane, octane, decane, undecane, dodecane, or mixtures thereof. In some embodiments, the chemical reaction is a coupling reaction. In some embodiments, the chemical reaction is a Suzuki-Miyaura coupling reaction. In some embodiments, the chemical reaction is a hydrodeoxygenation. In some embodiments, the chemical reaction is a hydrogenation.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

EXAMPLES

The following Examples are presented to illustrate various aspects of the present application, but are not intended to limit the scope of the claimed application.

Example 1

Materials and Methods

Materials: Compound 1 was synthesized according to previously reported procedures (Key et al., "A Molecular/Heterogeneous Nickel Catalyst for Suzuki-Miyaura Coupling," *Organometallics,* 38:2007-2014 (2019)). 1|$SiO_2$ was prepared following the one-step method previously reported (Key et al., "A Molecular/Heterogeneous Nickel Catalyst for Suzuki-Miyaura Coupling," *Organometallics,* 38:2007-2014 (2019)). Atomic layer deposition was carried out in a custom-built, hot-wall, flow-tube reactor with automated control software (Piercy and Losego, "Tree-Based Control Software for Multilevel Sequencing in Thin Film Deposition Applications," *J. Vac. Sci. Technol., B,* 33 (2015)) using a $TiCl_4$+$H_2O$ chemistry at 120° C. in a ~2 Torr flowing $N_2$ (>99.99% purity) atmosphere. ALD runs on catalyst powder were limited to a few grams sealed in a polyester fabric bag that permitted permeation of the precursor gases. To assist precursor gas permeation, a "hold" step was included in each ALD cycle. One full ALD cycle included: (1) close the gate valves, (2) pump down for 420 seconds, (3) reaction chamber isolation for 60 seconds, (4) $TiCl_4$ dose for 1 second directly into the isolated reaction chamber, (5) hold for 120 seconds, (6) pump down the reaction chamber for 30 seconds, (7) open the gate valves, (8) purge for 30 seconds, (9) $H_2O$ dose for 1 second, (10) purge for 30 seconds. The water dose, steps (9) and (10), were repeated three times for each cycle. Monitor silicon wafers were included in each run to estimate approximate $TiO_2$ film thickness using spectroscopic ellipsometry (Woollam Alpha-SE) (Piercy et al., "Variation in the Density, Optical Polarizabilities, and Crystallinity of $TiO_2$ Thin Films Deposited via Atomic Layer Deposition from 38 to 150° C. Using the Titanium Tetrachloride-Water Reaction," *J. Vac. Sci. Tech. A,* 35:03E107 (2017)). The procedure for the synthesis of Nickel nanoparticle catalysts prepared by charge enhanced dry impregnation (CEDI) has been reported (Zhu et al., "Charge-Enhanced Dry Impregnation: A Simple Way to Improve the Preparation of Supported Metal Catalysts," *ACS Catal.,* 3:625-630 (2013)). The $SiO_2$ support is Aerosil 300 (Evonik) and is a fumed, amorphous silica with 300 $m^2/g$ surface area and an average particle size of ~20 nm. Cross-coupling reaction solutions were prepared with ultra-pure (18 MΩ) water and 200 proof ethanol. All other materials and supplies were used as received from the supplier unless otherwise noted.

Instrumentation: A Bruker Advance III HD 300 was used for NMR spectroscopy. 1H data were collected at 300 MHz and 13C at 75 MHz. Bruker TopSpin software was used to process the NMR data. Inductively coupled plasma-mass spectrometry (ICP-MS) was collected on a Finnigan ELEMENT XR with a double focusing magnetic field with a quartz torch and injector (Thermo Fisher Scientific) and a 0.2 mL/min micromist U-series nebulizer (GE). Gas chromatography-mass spectrometry analyses were performed with a Shimadzu QP-20105 containing a RXI-5MS (Restek) column (30 m, 0.25 mm id). Mass spectrometer electron ionization was at 70 eV and the spectrometer was scanned from 1000 to 50 m/z at low resolution. Powder X-ray diffraction (XRD) was carried out with a Rigaku Miniflex-II with a D/teX Ultra silicon strip detector. Cu Kα radiation (l–1.5406 Å) was operated at 15 kV and 30 mA. Samples were loaded on a zero-background holder and scanned from 20-80° 2θ range at a scan rate of 3° 2θ/min. Fourier transform infrared-attenuated total reflection (FTIR-ATR) was performed on a Nicolet iS Fourier transform infrared spectrometer with an iD7 attenuated total reflectance attachment (diamond crystal). Before each sample set, a background scan of ambient atmosphere was collected and then subtracted from the experimental signal to calculate the final spectra reported. EPR spectra were collected on a Bruker EMXplus instrument equipped with a Bruker X-band microwave bridgehead. Spectra were recorded in a quartz EPR tube at room temperature at a power of 1.589 mW with a modulation amplitude of 2.0 G using the Xenon v1.1b.66 software. Nitrogen physisorption measurements were performed on samples pretreated for by placing the samples under 10 μmHg vacuum at room temperature, then ramping the temperature to 90° C. at 10° C./minute and holding for 6 hours. Nitrogen physisorption measurements were collected at 77 K and surface area characterized by BET.

General Cross-Coupling Reaction Set Up: In a 50 mL round-bottom flask, 0.68 mmol aryl halide and 0.82 mmol of boronic acid were added to a 20 mL solution comprise of 1:1 ethanol:water. 1.7 mmol of $K_3PO_4$ and 0.1 g of 1|$SiO_2$|$TiO_2$ were added to the flask (unless otherwise stated in the manuscript). The solution was heated to 105° C. for 24 hours. The reaction was then allowed to cool to room temperature and the products were extracted with 3 rinses with pentane and purified by preparative scale TLC (90:10 pentane:ethyl acetate mobile phase). For catalyst recycling, the solid catalyst was gravity filtered from the reaction solution and rinsed three times with pentane and three times with ethanol and dried under a stream of N2 (99.999%, Airgas) before being used in a new reaction.

Example 2

Results and Discussion

We recently reported on the design and catalytic testing of a molecular/heterogeneous nickel catalyst (Key et al., "A Molecular/Heterogeneous Nickel Catalyst for Suzuki-Miyaura Coupling," *Organometallics,* 38:2007-2014 (2019)). The catalyst in FIG. 1B was composed of a molecular terpyridine nickel catalyst bound to a solid $SiO_2$ support through a carboxylic acid linker. This molecular/heterogeneous catalyst exhibited prolonged catalyst lifetimes for Suzuki cross-coupling using dioxane as the solvent for the coupling partners, in addition the benefits of utilizing terpyridine ligands for nickel catalysts have also been explored (Winter and Schubert, "Metal-Terpyridine Complexes in Catalytic Application—A Spotlight on the Last Decade," *Chem Cat Chem,* 12:2890-2941 (2020)). The analogous homogeneous molecular catalyst quickly dimerized and became catalytically inactive. A series of control reactions and characterization of the molecular/heterogeneous catalyst pre- and post-reaction strongly supported the surface-bound catalyst being the active catalyst for cross-coupling reactivity. This molecular/heterogeneous catalyst, however, still required the toxic organic solvent dioxane to operate. Attempts to achieve cross-coupling reactivity in green solvents such as ethanol and water were unsuccessful. These failures were attributed to the protic, polar solvents disrupting catalyst binding to the $SiO_2$ support, resulting in desorption of the catalyst from the surface. Upon catalyst desorption, the molecular catalyst in solution quickly dimerized and deactivated. In this report, ALD is utilized (FIG. 1C) to overcome the previously observed catalyst deactivation and perform catalytic chemical synthesis in solvents containing a high-volume ratio of water.

Synthesis of 1|$SiO_2$|$TiO_2$

Figure 2:
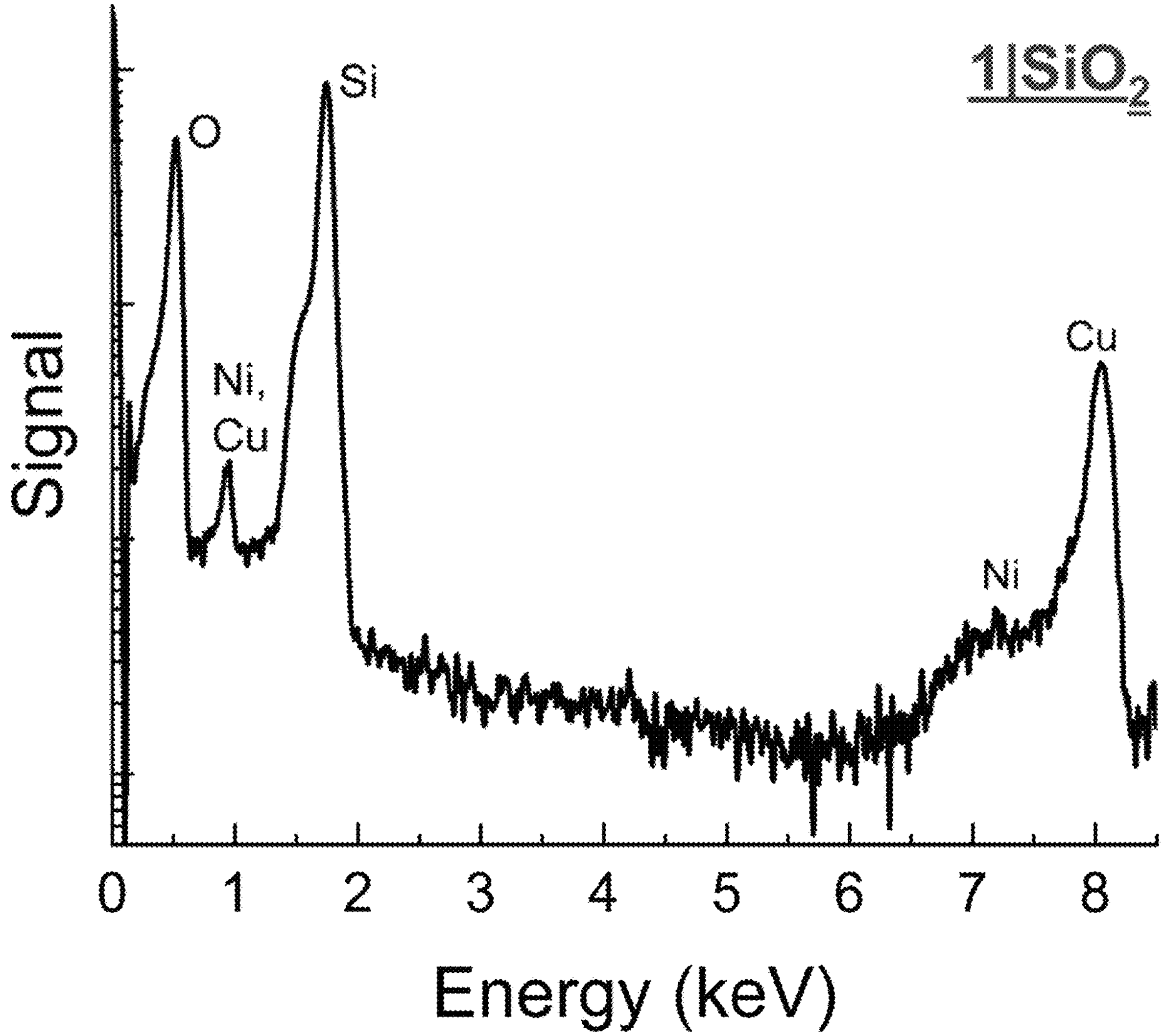
FIG. 2 provides EDS elemental analysis of 1|$SiO_2$ before atomic layer deposition. Individual elements are labeled for clarity. Note that the y-axis is a logarithmic scale because Si and O are orders of magnitude more abundant than Ni. Additionally, the Cu signal is from the copper grid used to hold samples in the STEM instrument. Lastly, carbon and nitrogen are likely present at ca. 0.27 and 0.39 keV, but these peaks are difficult to resolve and assign.
Figure 3A:
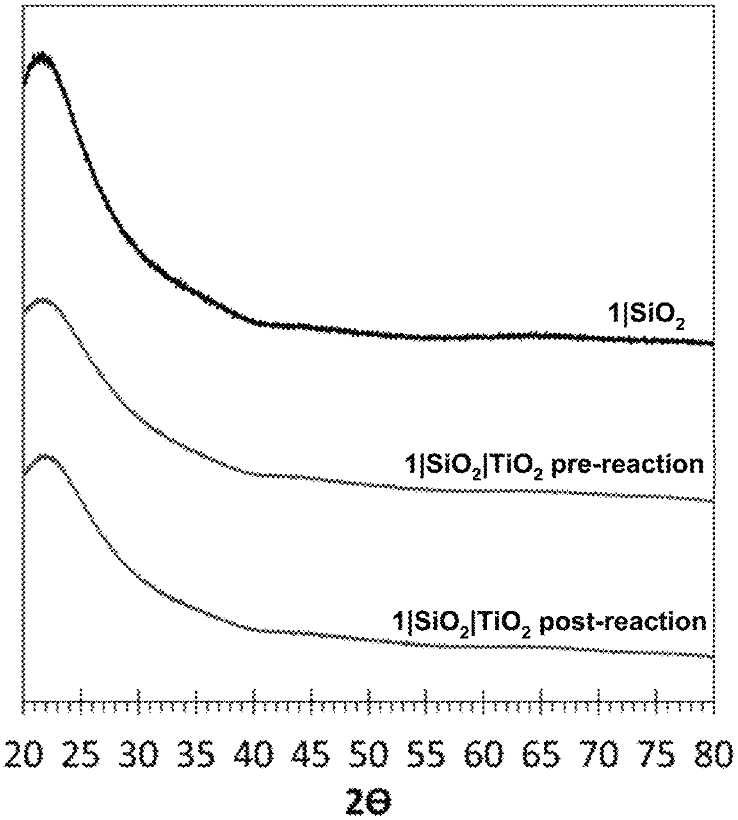
FIGS. 3A-B provide XRD data (FIG. 3A) and predicted signals for nickel nanoparticles (FIG. 3B), in accordance with some embodiments of the present disclosure.
Figure 3B:
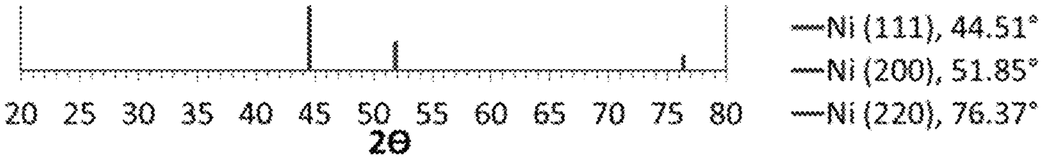
Figure 4A:
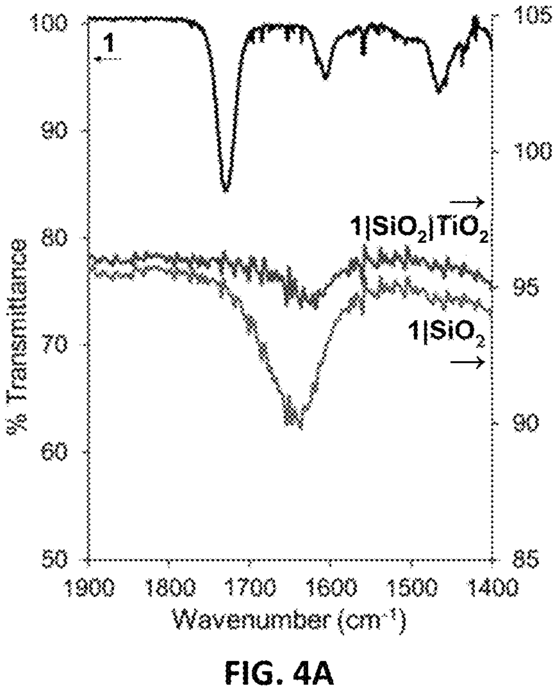
FIGS. 4A-B provide an overlay of FTIR-ATR spectra (FIG. 4A) and EPR spectra (FIG. 4B), in accordance with some embodiments of the present disclosure. The FTIR spectra are labeled as follows: molecular catalyst 1 without $SiO_2$ support, 1|$SiO_2$|$TiO_2$, and 1|$SiO_2$. The ERP spectra are labeled as follows: 1|$SiO_2$|$TiO_2$, molecular catalyst 1, nickel oxide on $SiO_2$ support.

The molecular catalyst [(2,2':6',2"-terpyridine-4'-benzoic acid)Ni(II)]$Cl_2$ (1) was synthesized following a previously reported procedure (Key et al., "A Molecular/Heterogeneous Nickel Catalyst for Suzuki-Miyaura Coupling," *Organometallics,* 38:2007-2014 (2019)). Loading of 1 onto Aerosil A300 $SiO_2$ support to form 1|$SiO_2$ (FIG. 1B) followed a one-step method also previously reported (Key et al., "A Molecular/Heterogeneous Nickel Catalyst for Suzuki-Miyaura Coupling," *Organometallics,* 38:2007-2014 (2019)). Catalyst 1|$SiO_2$ was characterized before atomic layer deposition to examine how ALD may affect the structure or binding of 1 to the $SiO_2$ support. ICP-MS analysis indicates that 1|$SiO_2$ contains 0.4 weight % nickel pre-ALD treatment, which equates to roughly $2\times10^{-7}$ mols of catalyst per $m^2$ of support surface area. In addition, elemental analysis from scanning transmission electron microscopy-energy dispersive spectroscopy (STEM-EDS) confirmed nickel was present on the $SiO_2$ particles (FIG. 2). X-ray diffraction (XRD) analysis of 1|$SiO_2$ (FIG. 3) does not show any evidence for crystalline nickel particles, suggesting that the molecular nickel catalyst, not metallic nickel or nickel oxide particles, are present on the $SiO_2$ support pre-ALD treatment. Infrared attenuated total reflection (FTIR-ATR) spectroscopy was used to characterize the ligand binding to the support. FIG. 4A shows the comparison of the FTIR of the molecular catalyst 1 to the FTIR-ATR of 1|$SiO_2$. The molecular catalyst 1 has a prominent C—O stretching frequency at 1729 $cm^{-1}$. Upon attachment of 1 to the $SiO_2$ support to form 1|$SiO_2$, this prominent C—O stretching frequency remains present but shifts to 1636 $cm^{-1}$. This shift is consistent with carboxylate binding to metal oxide supports as has been previously observed (Brennan et al., "Comparison of Silatrane, Phosphonic Acid, and Carboxylic Acid Functional Groups for Attachment of Porphyrin Sensitizers to TiO2 in Photoelectrochemical Cells," *PCCP,* 15:16605-16614 (2013); Naseeruddin et al., "Investigation of Sensitizer Adsorption and the Influence of Protons on Current and Voltage of a Dye-Sensitized Nanocrystalline $TiO_2$ Solar Cell," *J. Phys. Chem. B,* 107:8981-8987 (2003)).

Figure 5:
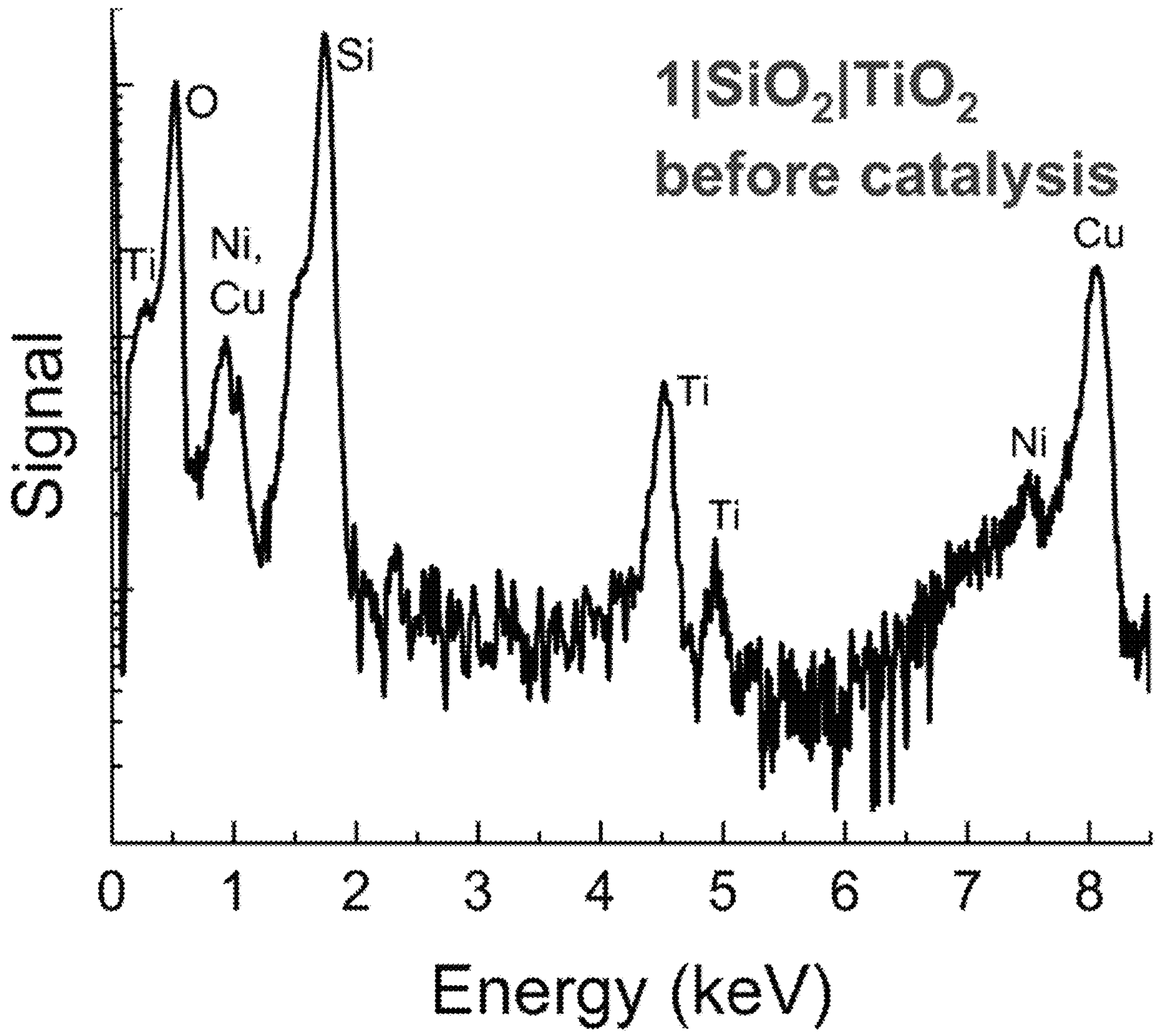
FIG. 5 provides EDS elemental analysis of 1|$SiO_2$|$TiO_2$ after $TiCl_4$+$H_2O$ atomic layer deposition but before catalytic reactions.

Catalyst 1|$SiO_2$ was then immobilized using $TiO_2$ ALD (10 cycles of $TiCl_4$+$H_2O$ as described in the experimental section). The ALD procedure was designed to coat 1|$SiO_2$ with a ~1.0 nm thick layer of $TiO_2$ to create the hybrid catalyst 1|$SiO_2$|$TiO_2$ as depicted in FIG. 1C. ICP-MS analysis reveals that 1|$SiO_2$|$TiO_2$ catalyst contains 0.35 weight % nickel, indicating minimal, if any, loss of nickel catalyst during ALD. We mainly attribute the lower weight % nickel to the increased weight of the solid catalyst with the addition of the $TiO_2$ layer. STEM-EDS analysis on 1|$SiO_2$|$TiO_2$ also detected the presence of Ni and Ti as expected (FIG. 5). XRD analysis of 1|$SiO_2$|$TiO_2$ again shows no evidence for nickel nanoparticles (FIG. 3) nor were any nanoparticles ever observed with STEM imagining (SI). The FTIR-ATR spectrum of 1|$SiO_2$|$TiO_2$, plotted in FIG. 4A, continues to show the existence of the C—O stretching frequencies that are indicative of carboxylate binding to metal oxides. No measurable shift in the C—O stretching frequencies between 1|$SiO_2$ and 1|$SiO_2$|$TiO_2$ suggests that the ALD treatment did not significantly alter the binding of the ligand to the $SiO_2$ support.

Figure 4B:
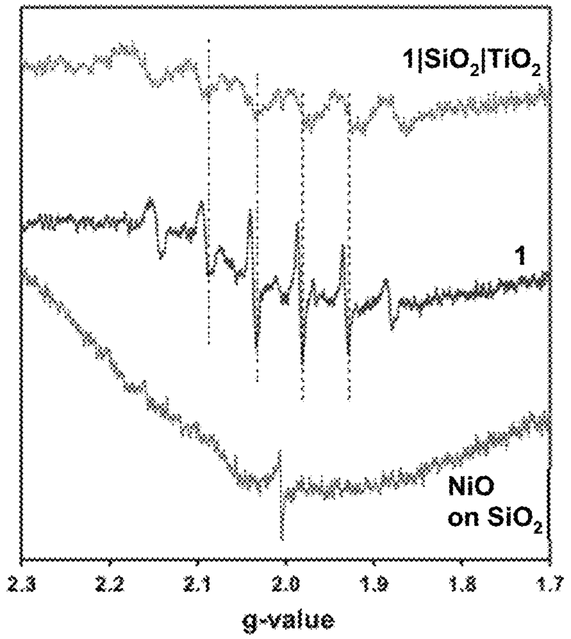

To investigate the stability of the nickel center of the catalyst, electron paramagnetic resonance (EPR) spectroscopy was utilized as shown on the right-hand side of FIG. 2. The EPR spectra shown in FIG. 4B include that of a solid sample of the molecular catalyst 1 obtained at room temperature and catalyst 1|$SiO_2$|$TiO_2$ after ALD coatings. The similar spectral splitting and shifts indicates the nickel centers between the two samples (1 and 1|$SiO_2$|$TiO_2$) have the same oxidation-states and chemical binding environment. For comparison, the EPR spectrum of nickel oxide on $SiO_2$ support is also shown in FIG. 4B. Nickel oxide particles exhibit a clearly distinct EPR spectrum, and the data in FIG. 4 taken as a whole, indicate the molecular nickel catalyst is stable and maintains molecular integrity throughout the ALD coating process. Differences in reactivity between 1|$SiO_2$ and 1|$SiO_2$|$TiO_2$ as discussed in the next section lend further support for the structure of 1|$SiO_2$|$TiO_2$ proposed here (vide infra).

Catalytic Performance

Figure 20:
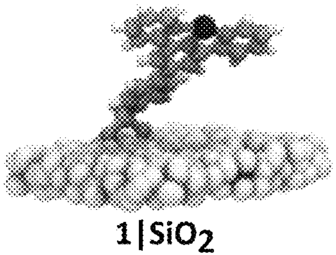
FIG. 20 provides the results of a series of catalytic Suzuki cross-coupling reactions performed to determine optimal ALD layer thickness for cross-coupling reactions in ethanol:water solvent. The test reactions compared molecular catalyst 1, $1|SiO_2$, and $1|SiO_2|TiO_2$ with various thickness of the $TiO_2$ ALD layer.
Figure 20:
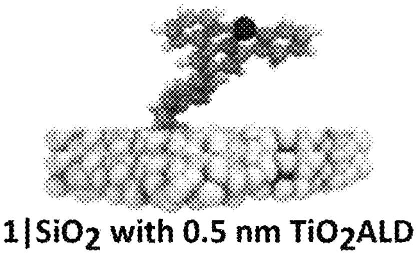
Figure 20:
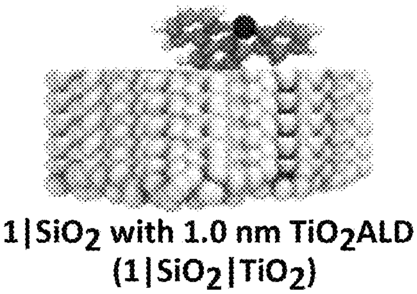
Figure 20:
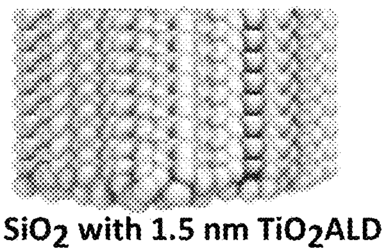

To illustrate the advantage of this hybrid ALD catalyst approach, and to determine the optimized ALD layer thickness, a series of catalytic Suzuki cross-coupling reactions were performed. FIG. 20 presents the results of these test reactions along with illustrations of the proposed ligand-first bound catalyst compositions. The reaction shown in FIG. 20 was chosen as a simple test reaction to determine the optimal conditions and catalyst composition. The reaction conditions were chosen to highlight the green chemistry possibilities of this catalytic system. For solid support hybrid catalysts, 0.9 mol % nickel catalyst was used per reaction with respect to the limiting reagent iodotoluene. The solvent system chosen was a 1:1 ratio of ethanol and water, with the ethanol serving to help increase the solubility of the organic substrates. The only reaction additive was $K_3PO_4$ base, where base is a mechanistic requirement for boronic acid activation (Norio and Suzuki, "Palladium-Catalyzed Cross-Coupling Reactions of Organoboron Compounds," *Chem. Rev.,* 95:2457-2483 (1995)). Lower reaction temperatures (80° C.) and shorter reaction times (12 hrs.) resulted in lower yields than compared to the optimal reaction temperature and time (105° C. and 24 hrs).

The results in FIG. 20 indicate that the optimal catalyst design consists of 1 attached to a $SiO_2$ support with approximately 1.0 nm thickness of $TiO_2$ applied via 10 ALD cycles (1|$SiO_2$|$TiO_2$). For molecular catalyst 1 in homogeneous solution, no product formation was detected. This result is due to rapid catalyst dimerization and deactivation promoted by water (FIG. 1A). The dimer, $[(\mu\text{-}X)Ni(tpy)]_2$ where X═$Cl^-$ or $OH^-$, has been shown to be inactive for this catalytic transformation (Key et al., "A Molecular/Heterogeneous Nickel Catalyst for Suzuki-Miyaura Coupling," *Organometallics,* 38:2007-2014 (2019)). The molecular catalyst 1 attached to an $SiO_2$ support without applied ALD layers (1|$SiO_2$), is able to generate product at a 5% yield, and post reaction analysis of 1|$SiO_2$ with ICP-MS revealed that the solid support no longer contained any detectable nickel. Thus, without an ALD layer, the polar ethanol water solvent mixture promotes the detachment of the molecular nickel catalyst from the surface of the $SiO_2$ support and the catalyst then deactivates in solution. A thin layer (less than 1 nm, see experimental section) of $TiO_2$ was then applied to the 1|$SiO_2$ structure via 5 ALD cycles and this catalyst produced the cross-coupled product with 32% yield. This non-optimal yield suggests that "thin" ALD layers are insufficient to fully protect the catalyst binding sites from solvent attack and subsequent desorption. The reason for incomplete protection is not entirely clear, but it is likely due to either poor coating uniformity at these thicknesses (i.e., nucleation delay) or simply insufficient thickness to block attack of the binding groups by the polar solvent.

Figure 6:
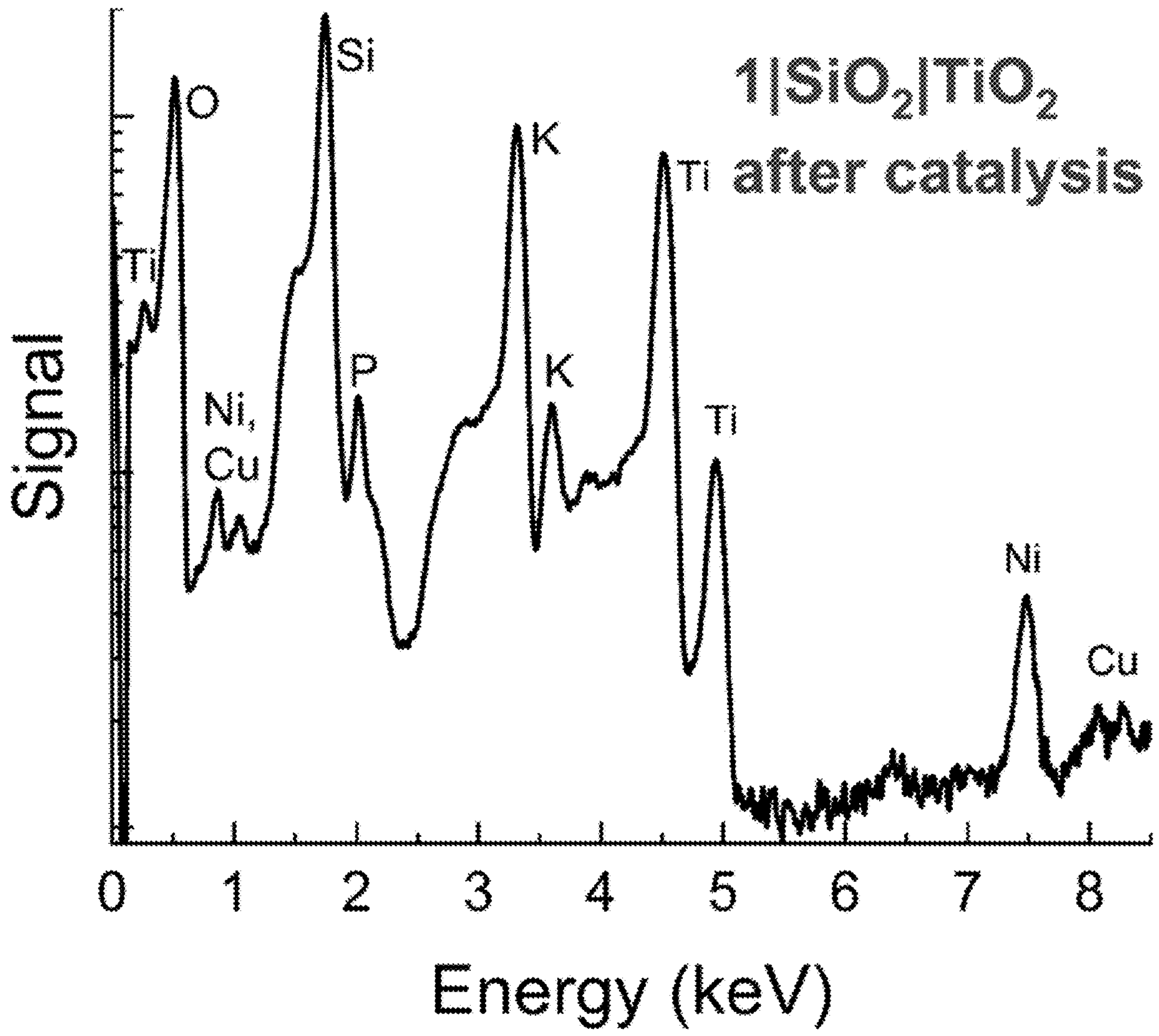
FIG. 6 provides EDS elemental analysis of 1|$SiO_2$|$TiO_2$ after $TiCl_4$+$H_2O$ atomic layer deposition and after catalytic reactions.
Figure 7:
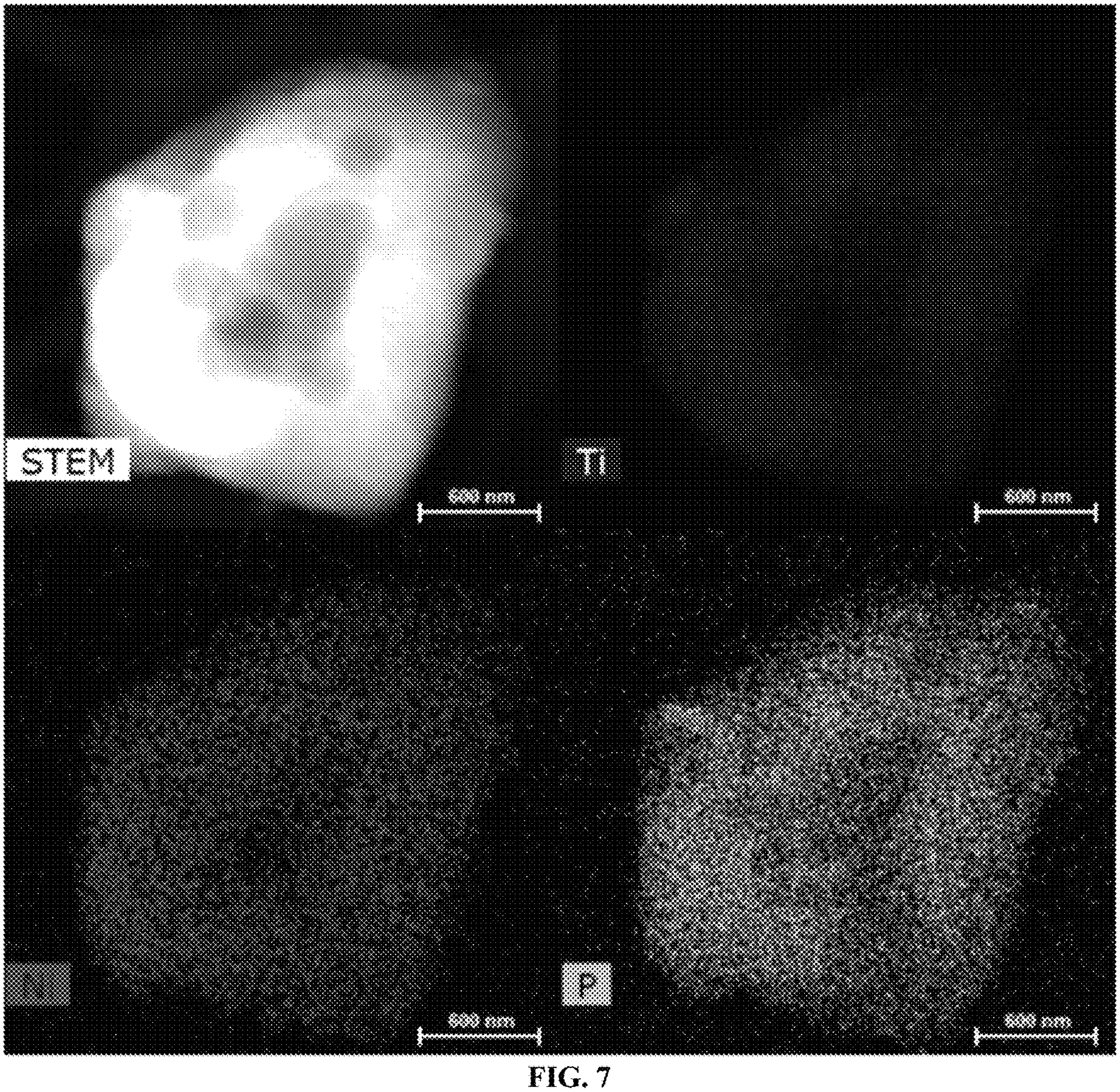
FIG. 7 provides a STEM image of 1|SiO2|TiO2 and elemental maps of Ti, Ni, and P detected post-reaction.
Figure 8:
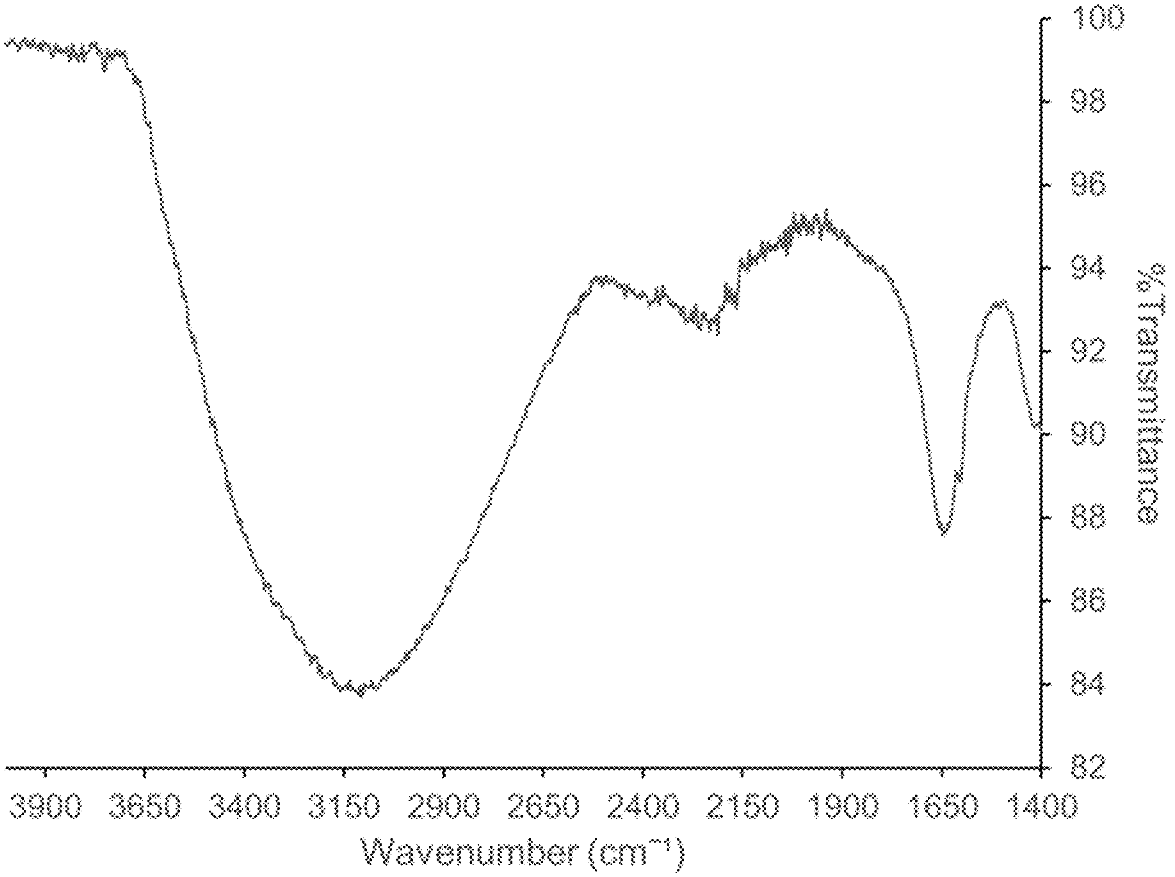
FIG. 8 provides the FTIR-ATR spectrum of 1|$SiO_2$|$TiO_2$ post reaction showing the C—O stretching frequency below 1650 $cm^{-1}$ attributed to catalyst ligand binding to the oxide support.

Next, a roughly 1 nm layer of $TiO_2$ was applied to the 1|$SiO_2$ structure via 10 ALD cycles to yield catalyst 1|$SiO_2$|$TiO_2$. As can be seen in FIG. 20, the 10 ALD cycle layer results in a catalyst capable of achieving optimal yields of the desired product. Computations on the Pd analogue of 1, calculated a distance between the C atom of the COOH group and the metal center was nearly 1.2 nm (DeLucia et al., "A Silica Supported Molecular Palladium Catalyst for Selective Hydrodeoxygenation of Aromatic Compounds Under Mild Conditions," *ACS Catal.,* 9:9060-9071 (2019)), indicating that an average 1 nm thick ALD layer would still expose the Ni center to the reaction solution. Post reaction ICP-MS indicates that 0.31 wt % nickel remained on the 1|$SiO_2$|$TiO_2$ catalyst, indicating that minimal nickel loss during the 24 hr reaction. ICP-MS analysis of the reaction solution post reaction did detect 1.77 μg of nickel per gram of solution. This minimal nickel in solution could occur due to nickel loss from the tpy ligand and not from complete molecular catalyst desorption from the surface of the oxide support. EDS analysis of the post-reaction catalyst also detected the continued presence of Ni and Ti on the $SiO_2$ surface (FIG. 6), and an elemental map showed highly dispersed Ni on the surface with no evidence of nanoparticle formation (FIG. 7), supported by XRD patterns (FIG. 3). In addition to the detected Ni and Ti, the STEM-EDS analysis shows potassium and phosphorous content on the surface, likely arising from the $K_3PO_4$ base used during the reaction. FTIR-ATR analysis of the solid molecular/heterogeneous catalyst post reaction also showed C—O stretching frequencies assigned to the ligand binding to the oxide support (FIG. 8).

Figure 9:
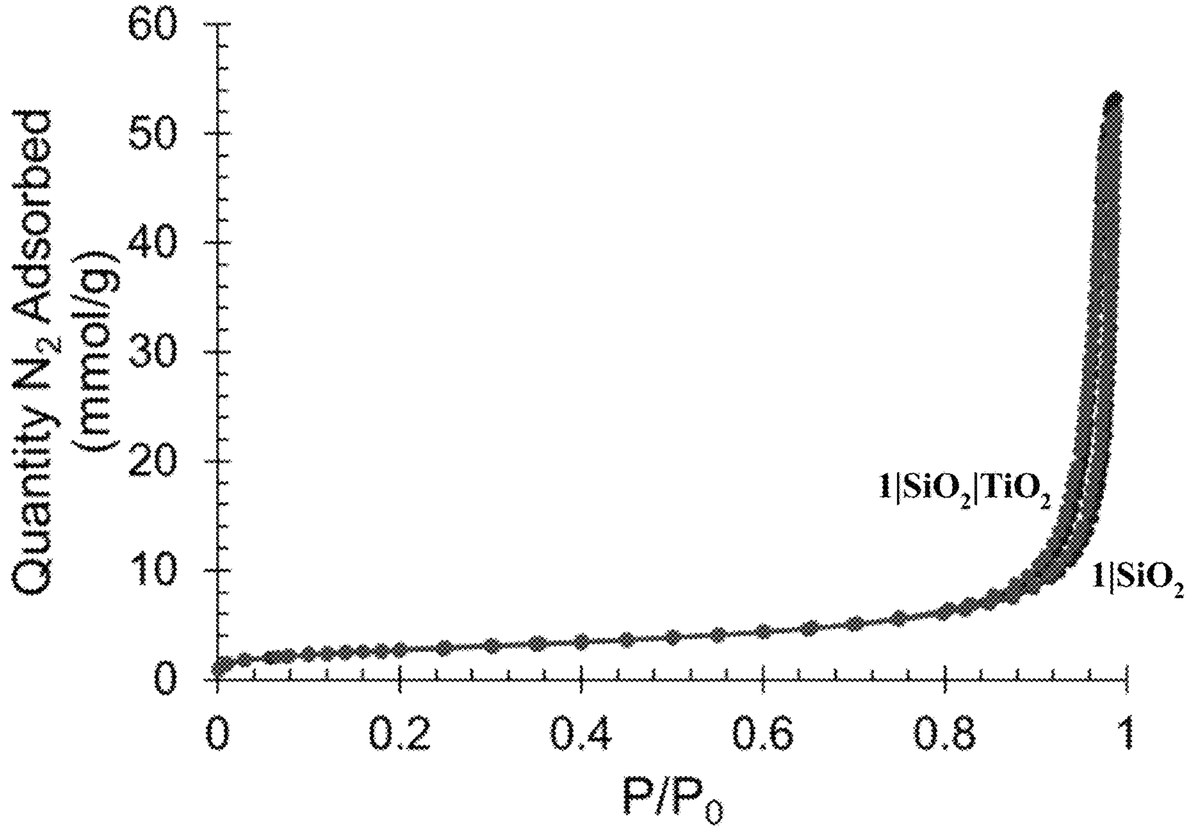
FIG. 9 provides $N_2$ adsorption/desorption isotherms for 1|$SiO_2$ (pre-ALD), and 1|$SiO_2$|$TiO_2$ (10 cycles ALD).
Figure 10:
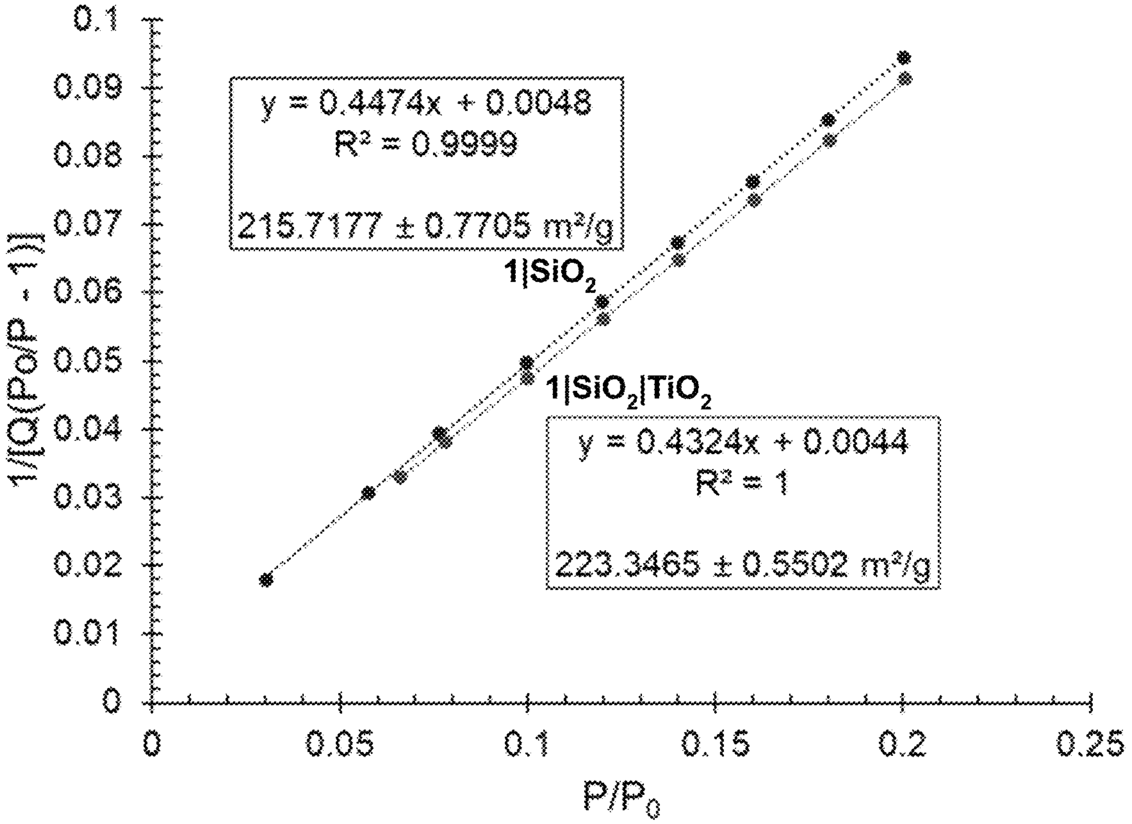
FIG. 10 provides BET transformation of $N_2$ isotherm data for 1|$SiO_2$ (pre-ALD), and 1|$SiO_2$|$TiO_2$ (10 cycles ALD).

These results suggest that the 10 ALD cycle $TiO_2$ layer now sufficiently coats the $SiO_2$ surface, fully immobilizing the molecular catalyst by stabilizing the ligand COOH binding to the oxide surface. This stabilized ligand binding prevents catalyst desorption and protects the catalyst from bimolecular degradations. Furthermore, BET analysis of $1|SiO_2$ and $1|SiO_2|TiO_2$ indicated that the ALD layer does not lead to an appreciable difference in surface area of the solid support ($216\pm0.8$ $m^2/g$ and $223\pm0.8$ $m^2/g$ respectively, FIGS. 9 and 10). The surface area analysis implies the ALD uniformly coats the $SiO_2$ support without clogging the micropores. It is also worth noting that molecular catalyst 1 attached to a $TiO_2$ support without ALD applied ($1|TiO_2$) did achieve a 38% yield of the cross-coupled product. This indicates the ligand binding to $TiO_2$ is stronger than to $SiO_2$, likely due to the higher isoelectric point of $TiO_2$ compared to $SiO_2$. The 38% yield from this reaction is considerably lower than optimized yields obtained through ALD coating, indicating that the catalyst does not just migrate to the $TiO_2$ layers and the binding sites are "buried" by the $TiO_2$ ALD as depicted in FIG. 20. Furthermore, post-reaction ICP-MS analysis of the $1|TiO_2$ catalyst revealed that the molecular catalyst 1 detaches from the surface of this support after a single reaction cycle, which is not consistent with catalysts coated with ALD layers (vide infra).

Lastly, a 2.0 nm layer of $TiO_2$ was applied to the catalyst via 20 ALD cycles. This "thick" coating results in almost no yield of the desired product, as shown in FIG. 20. ICP-MS analysis of the 2.0 nm thick $TiO_2$ catalyst revealed that the nickel is still present at levels nearly identical to the pre-reaction levels. Therefore, this result supports that ALD layers can be applied that are too thick and thus fully encase the molecular catalyst. This full enclosure of the catalyst strongly binds the catalyst to the surface but also prevents catalyst activity due to preventing the active nickel center from accessing the reaction substrates.

With the optimized ALD layer thickness determined, control reactions were performed to help further identify the active catalyst species. Results from these control reactions are summarized in Table 1. Reaction 1 in Table 1 shows the designed hybrid catalyst $1|SiO_2|TiO_2$ leads to an efficient product yield of 90%. For rxn. 3 in Table 1, the solid $1|SiO_2|TiO_2$ catalyst was filtered from reaction mixture and additional substrate was added to the filtrate solution and a second reaction was performed. No new product formation or substrate consumption was observed after the second reaction showing that the active catalyst is not present in the reaction filtrate post reaction.

TABLE 1

Control Reactions Performed to Identify the Catalytically Active Species.

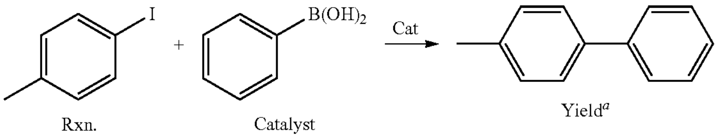

| Rxn. | Catalyst | Yield[a] |
|---|---|---|
| 1 | $1|SiO_2|TiO_2$ | 90% |
| 2 | $1|TiO_2$ | 32% |
| 3 | Reaction Filtrate | 0% |
| 4 | Only $SiO_2$ | 0% |
| 5 | Only $TiO_2$ | 0% |
| 6 | 1 nm $TiO_2$ on $SiO_2$ | 0% |
| 7 | 1 mol % 1 + $SiO_2$ in situ | 0% |
| 8 | 1 mol % 1 + $TiO_2$ in situ | 4% |
| 9 | 1 mol % $NiCl_2$ in solution | 0% |
| 10 | 1 mol % Rainey Ni in solution | 1% |
| 11 | 1 mol % $NiCl_2$ + $SiO_2$ in situ | 0% |
| 12 | 1 mol % Raney Ni + $SiO_2$ in situ | 0% |
| 13 | Ni nanoparticles$|SiO_2$ (CEDI) | 1% |
| 14 | $1|SiO_2|TiO_2$ + Hg drop | 82% |

Conditions: 0.82 mmol phenylboronic acid, 0.68 mmol iodotoluene, 1.7 mmol $K_3PO_4$ in 20 ml 1:1 ethanol/water.
105° C. 24 hr. 0.9 mol % $1|SiO_2|TiO_2$, 1.1 mol % CEDI.
[a]Determined by GC-MS analysis.

To confirm the necessity of the $1|SiO_2|TiO_2$ structure, numerous other active catalysts were also considered. As indicated by reactions 4 and 5, the untreated metal oxides powders are not catalytically active for this cross-coupling transformation. $SiO_2$ ALD coated with $TiO_2$ without molecular nickel catalyst present was also not active (reaction 6). A mixture of homogenous molecular catalyst and fresh oxide particles, reactions 7 and 8, did not result in appreciable product formation, indicating that the ligand-first surface-attachment of the molecular catalyst is necessary in the hybrid design. Decomposition of the molecular nickel catalyst to nickel salts ($NiCl_2$) or metallic nickel during the reaction could have also been possible. Testing of $NiCl_2$ or metallic Rainey Ni both in solution and in the presence of oxide support (reactions 9-12) resulted in poor product yields (<5%), indicating that these possible decomposition products are not responsible for the observed catalytic activity of $1|SiO_2|TiO_2$. We further examined the possibility that reduced nickel nanoparticles act as the catalytically active species. We synthesized 0.5 weight % nickel nanoparticle catalyst on the $SiO_2$ support using charge enhanced dry impregnation (CEDI) (Zhu et al., "Charge-Enhanced Dry Impregnation: A Simple Way to Improve the Preparation of Supported Metal Catalysts," *ACS Catal.*, 3:625-630 (2013)). The nickel nanoparticles did not exhibit catalytic activity in the water:ethanol mixture (rxn. 13), further illustrating an advantage of the designed hybrid ALD catalyst. To test for possible advantageous metallic species being catalytically active, the hybrid ALD catalyst was exposed to the mercury drop test. Mercury is known to poison heterogeneous metal nanoparticle catalysts (Campbell and Hislop, "Mercury Adsorption, Catalyst Poisoning, and Reactivation Phenomena on Metal Catalysts," *J. Catal.*, 13:12-19 (1969)). In the presence of Hg, the hybrid catalyst maintained catalytic activity (reaction. 13), which strongly indicates that the active catalytic species is molecular in nature. Furthermore, nickel first binding to the oxide surface to generate a SOMC moiety is highly unlikely, as SOMCs require extensive oxide surface preparation under air-free conditions (Copéret et al., "Surface Organometallic and Coordination Chemistry toward Single-Site Heterogeneous Catalysts: Strategies, Methods, Structures, and Activities," *Chem. Rev.,* 116:323-421 (2016)), while 1|$SiO_2$|$TiO_2$ was prepared in air without prior conditioning of the oxide surface.

Figure 12:
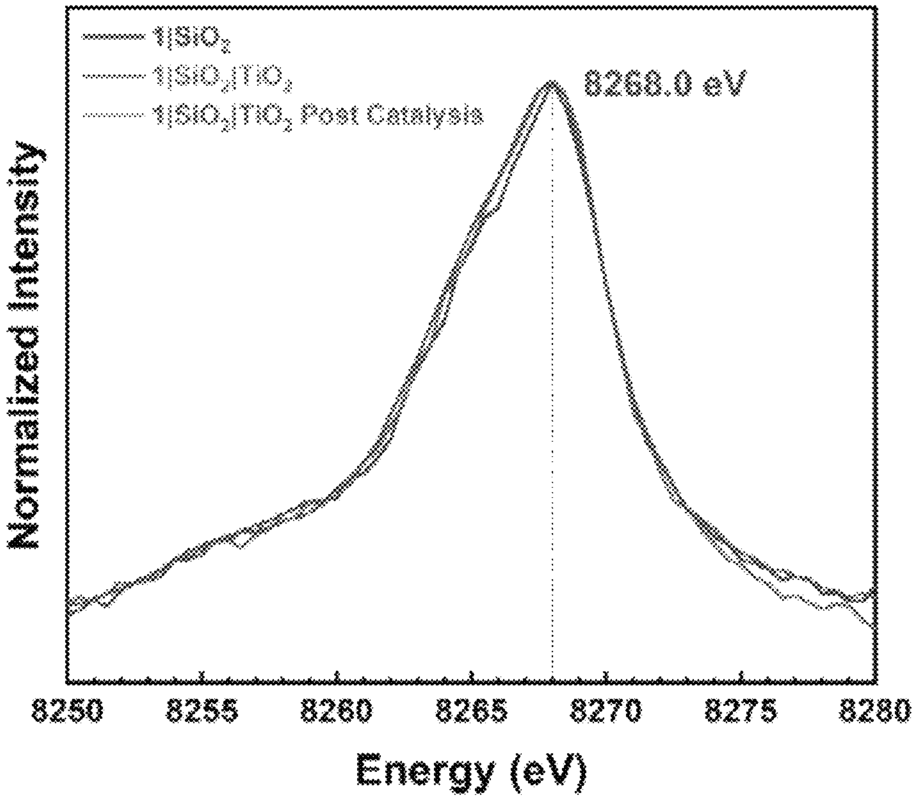
FIG. 12 provides normalized Ni Kβ XES spectra overlays of $1|SiO_2$ (no ALD coating), $1|SiO_2|TiO_2$ (with ALD coating, pre-reaction), and $1|SiO_2|TiO_2$ (with ALD coating, post 24 hour cross-coupling reaction).
Figure 13:
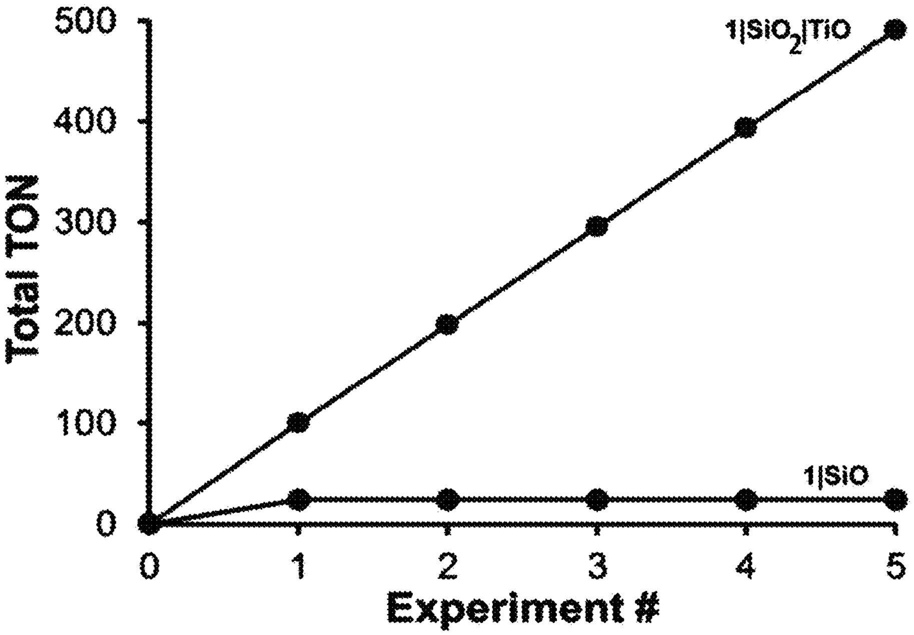
FIG. 13 provides the total summed turnover number (TON) vs. consecutive cross coupling reactions of $1|SiO_2|TiO_2$ and $1|SiO_2$. Experimental conditions are described in FIG. 20.

A further summary of the reactivity and stability of 1|$SiO_2$|$TiO_2$ in comparison to 1 and 1|$SiO_2$ can be found in Table 2. The data in Table 2 supports the conclusion that the hybrid catalyst containing an ALD overcoating (1|$SiO_2$|$TiO_2$) exhibits increased Suzuki cross-coupling reactivity due to the construction of the catalyst leading to extended lifetimes for the molecular component of the catalyst. IR spectroscopy focusing on the carboxylic frequencies indicates prolonged binding of the ligand to the oxide surface only when the ALD overcoat is applied. In addition, ICPMS analysis of the catalyst and the reaction solution shows retention of the majority of the nickel on the solid catalyst with 1|$SiO_2$|$TiO_2$. STEM-EDS analysis supports the ICPMS data, and elemental mapping (FIG. 7) of 1|$SiO_2$|$TiO_2$ post-reaction shows a uniform coating of the $TiO_2$ layer and well-dispersed nickel on the surface of the $SiO_2$ support. The characterization data in Table 2 combined with the reactivity data in Tables 1 and 2 provide compelling evidence that the designed hybrid catalyst 1|$SiO_2$|$TiO_2$ is the catalytically active species for the test Suzuki cross-coupling reaction under the chosen conditions.

clear shift in peak emission intensity from 8266.8 eV to 8267.5 eV, as would be expected for these reference powders' differences in chemical states. Next are scans for 1 in various states. First is the XES spectrum of 1|$SiO_2$, the catalyst before ALD coating. This catalyst exhibits a peak intensity at 8268.0 eV. This peak intensity is 0.5 eV shifted from the oxide state, indicating that XES is capable of detecting the difference in chemical states between NiO and the molecular catalyst 1. Shown next is the XES spectrum for 1|$SiO_2$|$TiO_2$, which exhibits an identical peak emission energy to 1|$SiO_2$ (8268.0 eV). This result again indicates that 1 maintains its molecular nature after ALD coating. Lastly is the spectrum for the 1|$SiO_2$|$TiO_2$ catalyst after a 24 hour reaction in 1:1 ethanol:water solvent. This "used" catalyst once again shows its maximum peak intensity at 8268.0 eV, further confirming Ni in 1 remains bound to its organic ligands. In fact, direct overlays of these three spectra, displayed in FIG. 12, show that all three samples have nearly identical XES spectra. Furthermore, roughly 500 catalytic turnovers were achieved with 1|$SiO_2$|$TiO_2$ for the reaction shown in FIG. 20, whereas the non-ALD catalyst 1|$SiO_2$ was only able to achieve roughly 25 turnovers before deactivation (FIG. 13). Over the course of 5 consecutive 24-hour reactions the hybrid ALD catalyst exhibited consistent catalytic activity and product formation. The summation of the products obtained from each reaction equates to roughly 500 catalytic turnovers without a considerably observed decrease in product formation over time (percent yields for each reaction range between 84% and 90%). Conversely, the

TABLE 2

Summary of the Characterization Data Comparing Homogeneous Catalyst (1), Hybrid Catalyst without ALD (1|$SiO_2$), and Hybrid Catalyst with ALD Overcoating (1|$SiO_2$|$TiO_2$).

| | | IR ($COOH\ cm^{-1}$) | | ICPMS (Ni wt %) catalyst | | ICPMS (Ni) solution | EDS elements detected* | | XRD (Ni particles?) | |
|---|---|---|---|---|---|---|---|---|---|---|
| Catalyst | % Yield | Pre | Post | Pre | Post | Post | Pre | Post | Pre | Post |
| 1 | 0 | 1729 | N/A | N/A | N/A | N/A | N/A | N/A | N/A | N/A |
| 1\|$SiO_2$ | 5 | 1639 | N.S. | 0.35 | 0.06 | 170 μg | Ni | N.S. | No | No |
| 1\|$SiO_2$\|$TiO_2$ | 90 | 1640 | 1640 | 0.35 | 0.31 | 35 μg | Ni, Ti | Ni, Ti, K, P | No | No |

N/A: data not collected/not applicable.
N.S.: no signal.
Pre and Post refer to pre-reaction and post-reaction, reaction details in FIG. 20.
*EDS detected Si and O in every measurement.

Figure 11:
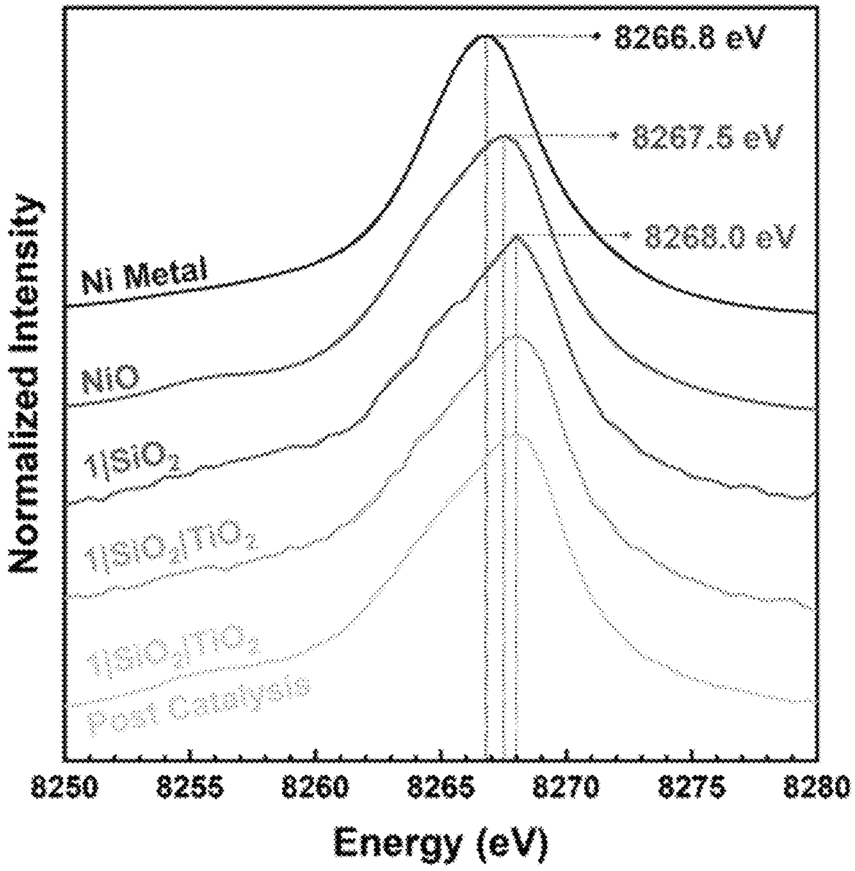
FIG. 11 provides XES spectra overlays comparing the hybrid catalyst before ALD coating (1|$SiO_2$) to the hybrid catalyst after ALD before performing a cross-coupling reaction (1|$SiO_2$|$TiO_2$) and 1|$SiO_2$|$TiO_2$ post catalytic reaction to nickel oxide and nickel metal samples supported on $SiO_2$ support, in accordance with some embodiments of the present disclosure.

This hybrid catalyst exhibits desirable green chemistry principles (Bryan et al., "Key Green Chemistry Research Areas from a Pharmaceutical Manufacturers' Perspective Revisited," *Green Chem.,* 20:5082-5103 (2018); Anastas and Warner, Green Chemistry: Theory and Practice, Oxford University Press, New York, 1998) such as the use of earth abundant nickel, low metal loadings which help prevent product contamination (Li and Trost, "Green Chemistry for Chemical Synthesis," *Proc. Natl. Acad. Sci.,* 105:13197-13202 (2008)), ease of catalyst separation from reaction mixtures without the need for column chromatography, and a green solvent mixture of $H_2O$ and ethanol. To further evaluate the chemical stability of this catalysts design, 1|$SiO_2$|$TiO_2$ was examined with X-ray emission spectroscopy (XES) before and after use in a Suzuki cross-coupling reaction. FIG. 11 overlays the XES spectra at the Ni 2p emission for five different nickel samples. Here, the emission energy is indicative of the nickel's chemical binding state. The top two spectra are reference scans made on nickel metal and nickel oxide (NiO) powders. Here, we observe a 1|SiO2 catalyst produced a minimal number of turnovers (~25) in the first reaction and then deactivates, resulting in no additional turnovers.

Figure 14:
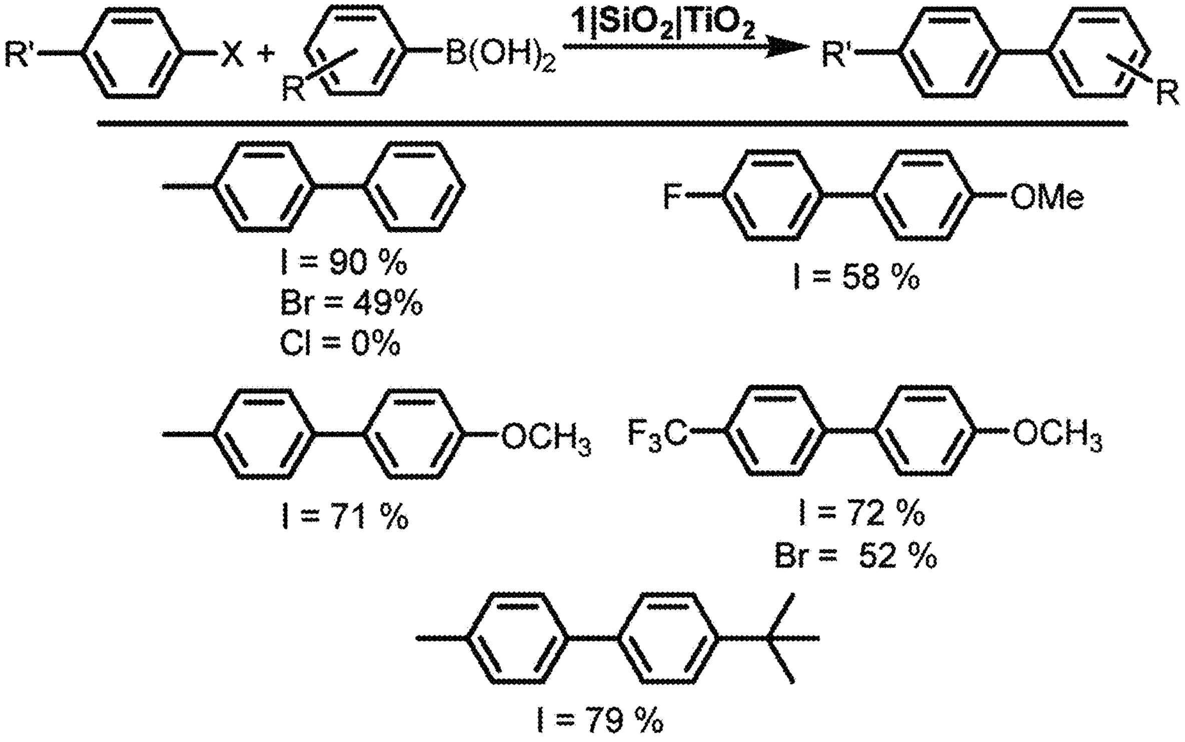
FIG. 14 provides the results of catalytic Suzuki cross-coupling achieved by hybrid ALD catalyst, in accordance with some embodiments of the present disclosure. Percent yields are isolated yield and based on limiting reagent. Reaction conditions: 0.82 mmol phenylboronic acid, 0.68 mmol iodotoluene, 1.7 mmol $K_3PO_4$ in 20 ml 1:1 ethanol/water, 105° C., 24 hr, 100 mg $1|SiO_2|TiO_2$.
Figure 15:
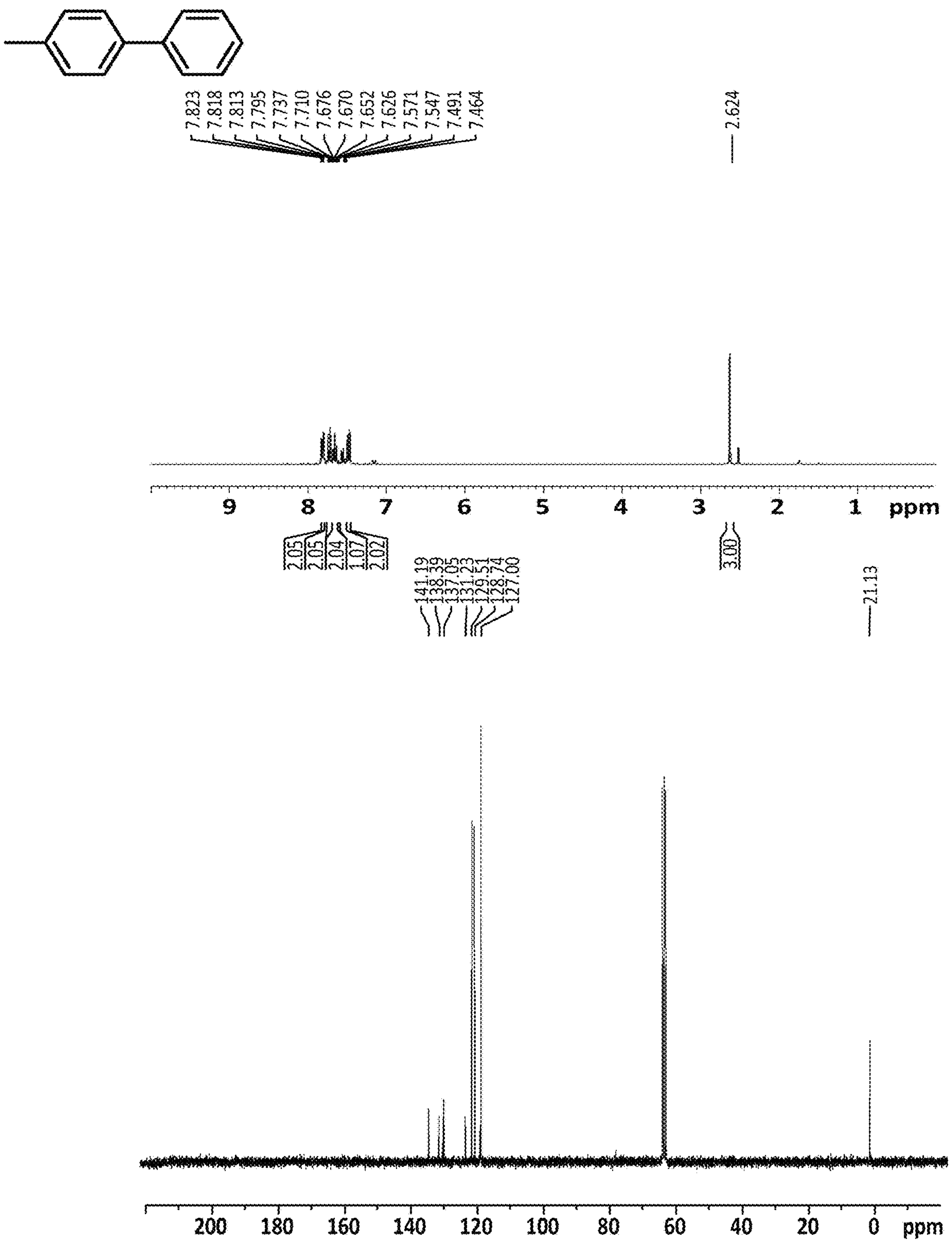
FIG. 15 provides $^1H$ and $^{13}C$ NMR of 4-Methyl-1,1'-biphenyl which compares to previously reported product spectra (Choy et al., "A Highly Efficient Monophosphine Ligand for Parts per Million Levels Pd-Catalyzed Suzuki-Miyaura Coupling of (Hetero)Aryl Chlorides," *Eur. J. Org. Chem.,* 2020:2846-2853 (2020)) in accordance with some embodiments of the present disclosure.
Figure 16:
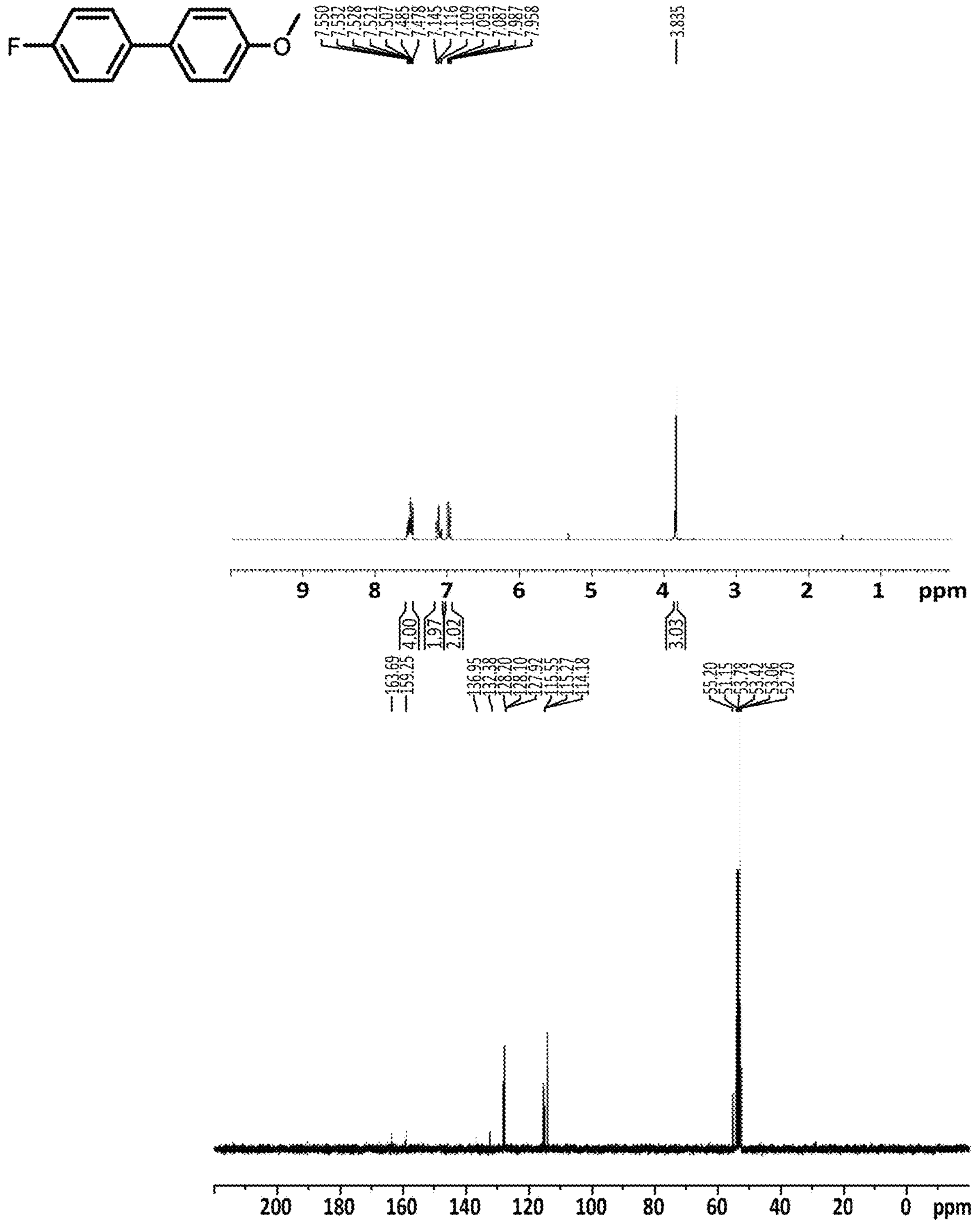
FIG. 16 provides $^1H$ and $^{13}C$ NMR of 4-Fluoro-4'-methoxy-1,1'-biphenyl which compares to previously reported product spectra (Inaloo et al., "Nickel(II) Nanoparticles Immobilized on EDTA-Modified $Fe_3O_4$@$SiO_2$ Nanospheres as Efficient and Recyclable Catalysts for Ligand-Free Suzuki-Miyaura Coupling of Aryl Carbamates and Sulfamates," *ACS Omega,* 5(13):7406-7417 (2020)) in accordance with some embodiments of the present disclosure.
Figure 17:
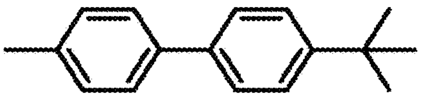
FIG. 17 provides $^1H$ and $^{13}C$ NMR of 4-(tert-butyl)-4'-methyl-1,1'-biphenyl which compares to previously reported product spectra (Choy et al., "A Highly Efficient Monophosphine Ligand for Parts per Million Levels Pd-Catalyzed Suzuki-Miyaura Coupling of (Hetero)Aryl Chlorides," *Eur. J. Org. Chem.,* 2020:2846-2853 (2020)) in accordance with some embodiments of the present disclosure.
Figure 17:
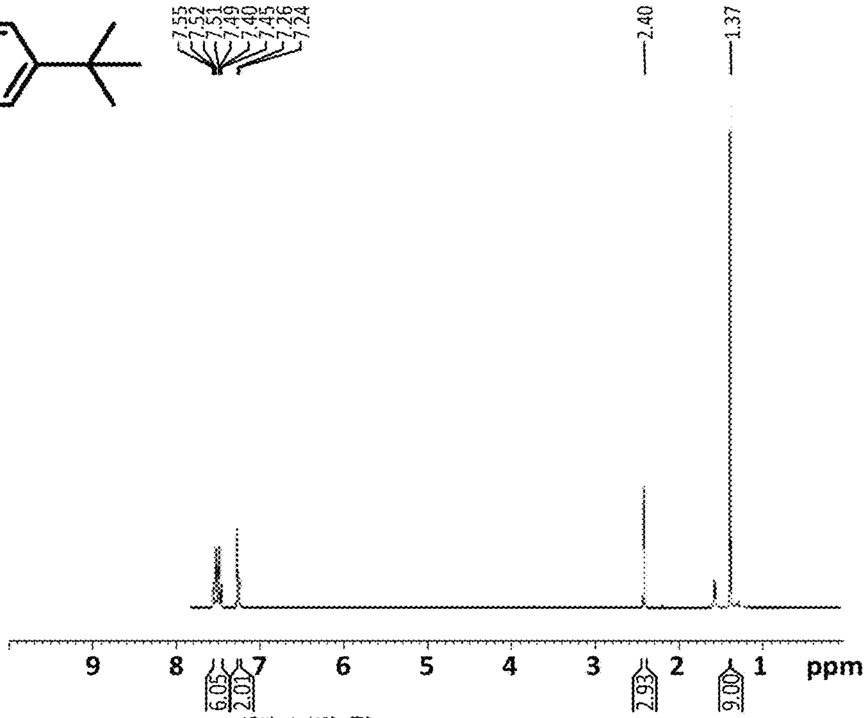
Figure 17:
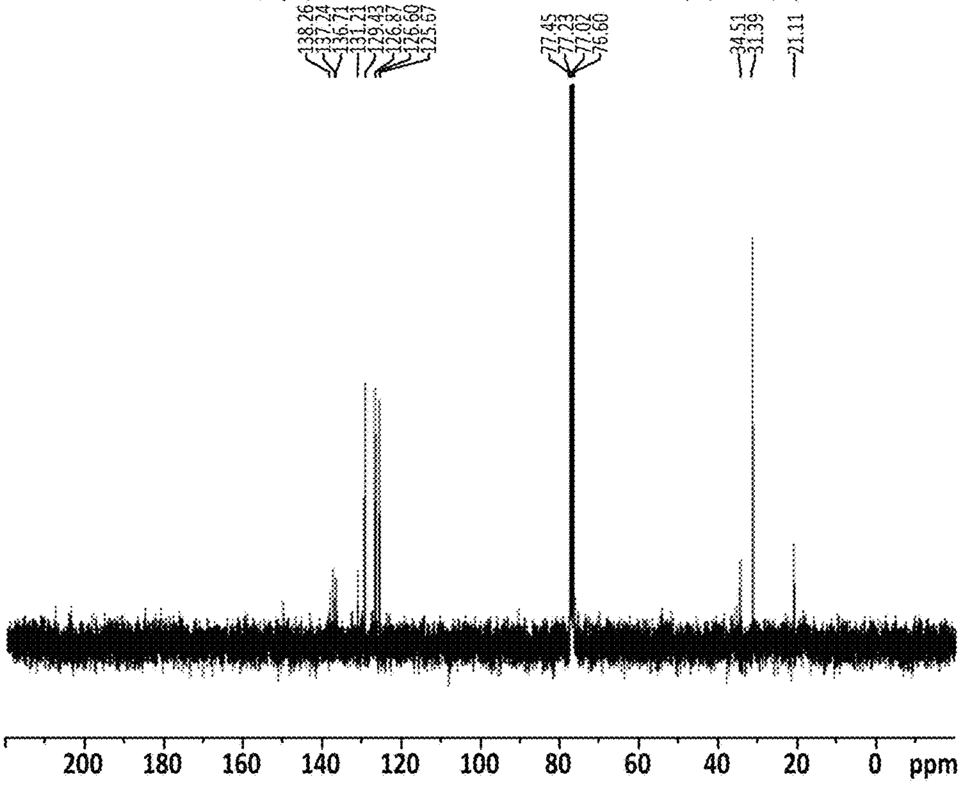
Figure 18:
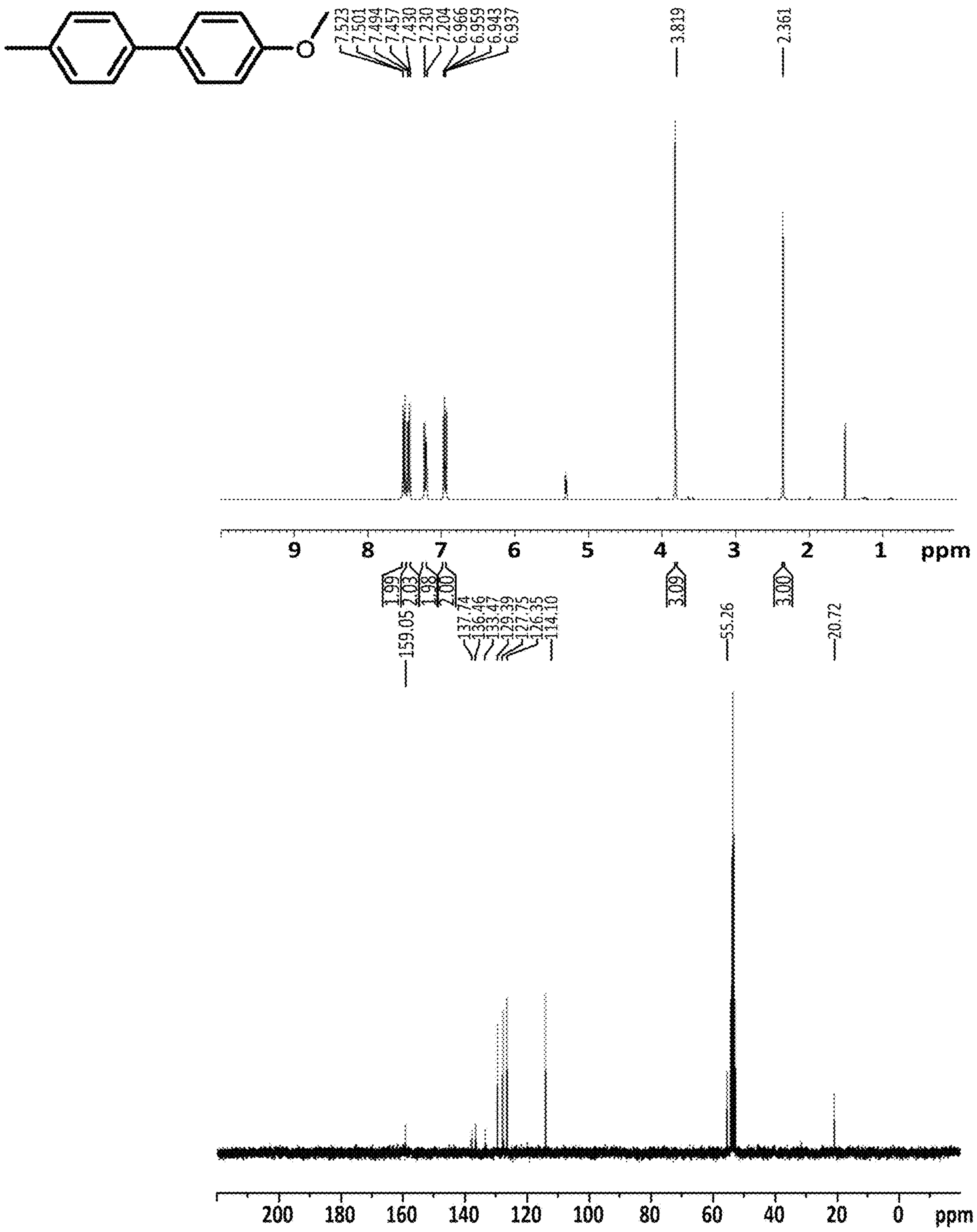
FIG. 18 provides $^1H$ and $^{13}C$ NMR of 4-methoxy-4'-methyl-1,1'-biphenyl which compares to previously reported product spectra (Choy et al., "A Highly Efficient Monophosphine Ligand for Parts per Million Levels Pd-Catalyzed Suzuki-Miyaura Coupling of (Hetero)Aryl Chlorides," *Eur. J. Org. Chem.,* 2020:2846-2853 (2020)) in accordance with some embodiments of the present disclosure.
Figure 19:
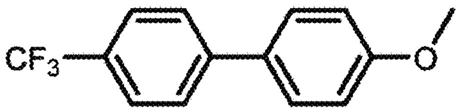
FIG. 19 provides $^1H$ and $^{13}C$ NMR of 4-methyl-4'-(trifluoromethyl)-1,1'-biphenyl which compares to previously reported product spectra (Delaney et al., "Potassium Trimethylsilanolate Enables Rapid, Homogeneous Suzuki-Miyaura Cross-Coupling of Boronic Esters," *ACS Catal.,* 10:73-80 (2020)) in accordance with some embodiments of the present disclosure.
Figure 19:
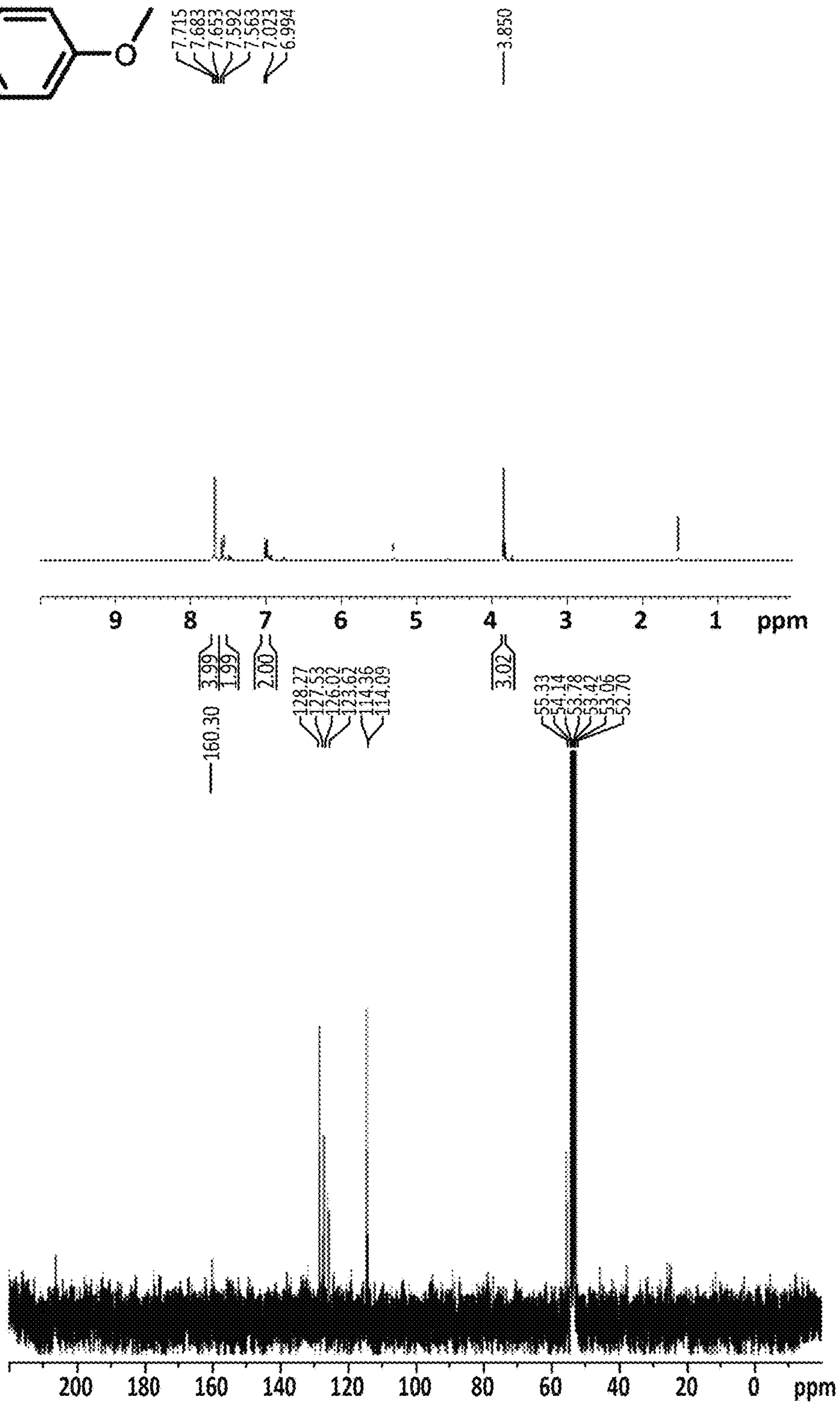

To ensure this catalyst is generally amenable to Suzuki cross-coupling reactivity and not just applicable to a single reaction, a modest substrate scope for this catalyst was examined. FIG. 14 shows the range of cross-coupling partners explored and products obtained from this hybrid ALD catalyst. In general, 1|$SiO_2$|$TiO_2$ was able to couple a variety of aryl halide and aryl boronic acid substrates with yields that range between 49 to 90%. 1|$SiO_2$|$TiO_2$ exhibits greater reactivity towards aryl iodides compared to aryl bromides or chlorides. This reactivity trend has been previously observed for [(2,2':6',2"-terpyridine)Ni(II)]$Cl_2$ cross-coupling catalysis (Paul et al., "Photoredox-Assisted Reductive Cross-Coupling: Mechanistic Insight into Catalytic Aryl-Alkyl Cross-Couplings," *J. Org. Chem.,* 82:1996-2003 (2017)). As can be seen in FIG. 14, a range of electron donating and electron withdrawing substrates are amenable to cross-coupling using 1|$SiO_2$|$TiO_2$ as the catalyst. This result illustrates that the reported hybrid catalyst motif may be a general approach towards designing cross-coupling catalysts.

List of $^{1}H$ & $^{13}C$ NMR peaks of products: Multiplicity was indicated as follows: s (singlet), d (doublet), t (triplet), q (quartet), m (multiplet). NMR spectra are provided in FIGS. 15-19.

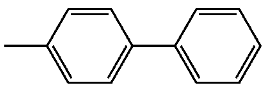

$^{1}H$ NMR (DMSO, 300 MHz) δ 2.62 (s, 3H), 7.46 (d, J=9.0 Hz, 2H), 7.55-7.57 (m, 1H), 7.63 (t, J=7.3 Hz, 2H), 7.71-7.74 (d, J=9.0 Hz, 2H), 7.80-7.82 (m, 2H). $^{13}C$ NMR ($CDCl_3$, 300 MHz) δ (ppm): 21.13, 127.00, 128.74, 129.51, 131.23, 137.05, 138.39, 141.19.

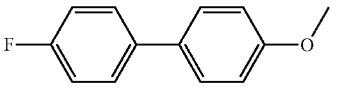

$^{1}H$ NMR ($CD_2Cl_2$, 300 MHz) δ 3.84 (s, 3H), 6.96-6.99 (m, 2H), 7.09-7.15 (m, 2H), 7.48-7.55 (m, 4H). $^{13}C$ NMR ($CD_2Cl_2$, 300 MHz) δ (ppm): 55.28, 114.18, 115.27, 115.55, 127.91, 128.20, 132.55, 136.95, 159.25, 163.69.

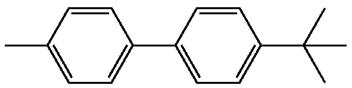 [SMILES: Cc1ccc(-c2ccc(C(C)(C)C)cc2)cc1]

$^{1}H$ NMR ($CDCl_3$, 300 MHz) δ 1.37 (s, 9H), 2.40 (s, 3H), 7.24-7.26 (d, J=7.9 Hz, 2H), 7.45-7.55 (m, 6H). $^{13}C$ NMR ($CDCl_3$, 300 MHz) δ (ppm): 21.11, 31.39, 34.51, 125.67, 126.60, 126.87, 129.43, 131.21, 136.71, 137.24, 138.26.

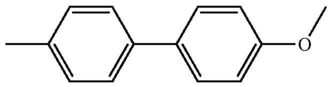

$^{1}H$ NMR ($CD_2Cl_2$, 300 MHz) δ 2.36 (s, 3H), 3.82 (s, 3H), 6.94-6.96 (d, J=8.8 Hz, 2H), 7.20-7.23 (d, J=8.0 Hz, 2H), 7.43-7.46 (d, J=8.13, 2H), 7.49-7.52 (d, J=8.8 Hz, 2H). $^{13}C$ NMR ($CD_2Cl_2$, 300 MHz) δ (ppm): 20.72, 55.26, 114.10, 126.35, 127.75, 129.39, 133.47, 136.46, 137.74, 159.05.

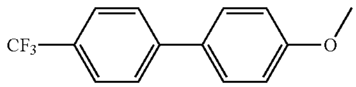

$^{1}H$ NMR (DMSO, 300 MHz) δ 3.85 (s, 3H), 6.99-7.02 (d, J=8.6 Hz, 2H), 7.56-7.59 (d, J=8.6 Hz, 2H), 7.65-7.71 (m, 4H). $^{13}C$ NMR ($CDCl_3$, 300 MHz) δ (ppm): 55.33, 114.09, 114.36, 125.62, 126.82, 127.53, 128.28, 160.30.

CONCLUSIONS

This study demonstrates a new paradigm in the design of hybrid catalysts in which ALD is used to improve the attachment and stability of molecular catalysts on solid metal oxide supports. Generating hybrid catalysts with increased catalyst lifetimes makes the catalysts amenable for the use of green solvents and easily separable from reaction solutions. At an optimal ALD layer thickness, the molecular catalyst remains highly active while still being resistant to surface detachment and subsequent deactivation. Through a series of control experiments and spectroscopic characterizations, we provide strong evidence for the active species to be the unperturbed molecular catalyst attached to the metal oxide surface and encased with an optimal ALD deposited $TiO_2$ layer. Interestingly, the exemplary molecular catalyst studied here is not catalytically active by itself in homogeneous solution for the target carbon-carbon cross-coupling reaction due to extremely short catalyst lifetimes. Thus, a combination of ligand-first surface attachment with molecular design and ALD application could lead to new approaches in catalyst discovery. Noteworthy here for green chemistry principles is that this hybrid catalyst was able to perform cross-coupling catalysis using a non-noble metal (nickel) and earth abundant oxides and is active in a near-neutral pH, primarily aqueous solution. Moreover, since the optimal ALD coating requires only about 10 reaction cycles, this process is technologically and economically viable for large-scale manufacturing.

What is claimed is:

1. A heterogeneous chemical catalyst comprising:

a substrate;

a molecule attached to the substrate via a binding site, wherein the molecule comprises a catalytic moiety having a catalytic active site and a linking moiety that couples the substrate to the molecule, a coating layer coating at least a portion of the binding site such that the catalytic active site is exposed.

2. The heterogeneous chemical catalyst of claim 1, wherein the coating layer adheres the molecule to the substrate.

3. The heterogeneous chemical catalyst of claim 1, wherein the coating layer is a vapor deposited coating layer.

4. The heterogeneous chemical catalyst of claim 1, wherein the coating layer coats the entirety of the linking moiety.

5. The heterogeneous chemical catalyst of claim 1, wherein the linking moiety is selected from the group consisting of —COOH, —$PO_3H_2$, —$SO_3H$, —$OPO_3H$, —$OSO_3H$, C(O)NHOH, silatranes, silanes, siloxanes, disulfides, and thiols.

6. The heterogeneous chemical catalyst of claim 1, wherein the coating layer has a thickness of between about 0.1 nm and about 10 nm.

7. The heterogeneous chemical catalyst of claim 1, wherein the substrate comprises one or more compounds selected from the group consisting of silicon oxide, titanium oxide, aluminum oxide, zirconium oxide, nickel oxide, zinc oxide, niobium oxide, chromium oxide, hafnium oxide, lanthanum oxide, yttrium oxide, cerium oxide, tantalum oxide, magnesium oxide, strontium oxide, calcium oxide, indium oxide, tin doped indium oxide, tin oxide, fluorine doped tin oxide, copper oxide, cobalt oxide, iron oxide, and mixtures thereof.

8. The heterogeneous chemical catalyst of claim 1, wherein the molecule comprises one or more transition metal coordination complexes.

9. The heterogeneous chemical catalyst of claim 1, wherein the coating layer comprises one or more compounds selected from the group consisting of metal oxides, metal oxyhydroxides, metal hydroxides, metal nitrides, and metal carbides.

10. The heterogeneous chemical catalyst of claim 9, wherein the coating layer comprises one or more compounds selected from the group consisting of aluminum oxide, titanium oxide, hafnium oxide, zirconium oxide, zinc oxide, silicon oxide, magnesium oxide, calcium oxide, strontium oxide, barium oxide, vanadium oxide, chromium oxide, manganese oxide, iron oxide, cobalt oxide, nickel oxide, copper oxide, niobium oxide, molybdenum oxide, ruthenium oxide, indium oxide, tin oxide, bismuth oxide, lead oxide, Lanthanum oxide, tantalum oxide, tungsten oxide, cerium oxide, neodymium oxide, europium oxide, ytterbium oxide, dysprosium oxide, and their solid solutions and multicomponent compounds.

11. The heterogeneous chemical catalyst of claim 1, wherein A suspension comprising the heterogeneous chemical catalyst of claim 1 suspended in a polar protic, polar, or protic solvent.

12. The method for preparing a catalyst mixture, comprising suspending the heterogeneous chemical catalyst of claim 1 in a polar protic, polar, or protic solvent to undergo a chemical reaction.

13. The method of claim 12, wherein the chemical reaction is a coupling reaction.

14. A method of preparing a heterogeneous chemical catalyst comprising:

providing a substrate;

attaching a molecule to the substrate via a binding site, the molecule comprising a catalytic moiety having a catalytic active site and a linking moiety that couples the substrate to the molecule;

coating, with a coating layer, at least a portion of the binding site such that the catalytic active site is exposed, to form the heterogeneous chemical catalyst.

15. The method of claim 14, wherein coating the at least a portion of the binding site comprises one or more cycles of a vapor deposition process that undergoes self-limiting sequential reactions.

16. The method of claim 14, wherein the substrate comprises one or more compounds selected from the group consisting of silicon oxide, titanium oxide, aluminum oxide, zirconium oxide, nickel oxide, zinc oxide, niobium oxide, chromium oxide, hafnium oxide, lanthanum oxide, yttrium oxide, cerium oxide, tantalum oxide, magnesium oxide, strontium oxide, calcium oxide, indium oxide, tin doped indium oxide, tin oxide, fluorine doped tin oxide, copper oxide, cobalt oxide, iron oxide, and mixtures thereof.

17. The method of claim 14, wherein the molecule comprises one or more transition metal coordination complexes.

18. The method of claim 14, wherein the coating layer comprises one or more compounds selected from the group consisting of metal oxides, metal oxyhydroxides, metal hydroxides, metal nitrides, and metal carbides.

19. The method of claim 18, wherein the coating layer comprises one or more compounds selected from the group consisting of aluminum oxide, titanium oxide, hafnium oxide, zirconium oxide, zinc oxide, silicon oxide, magnesium oxide, calcium oxide, strontium oxide, barium oxide, vanadium oxide, chromium oxide, manganese oxide, iron oxide, cobalt oxide, nickel oxide, copper oxide, niobium oxide, molybdenum oxide, ruthenium oxide, indium oxide, tin oxide, bismuth oxide, lead oxide, Lanthanum oxide, tantalum oxide, tungsten oxide, cerium oxide, neodymium oxide, europium oxide, ytterbium oxide, dysprosium oxide, and their solid solutions and multicomponent compounds.

* * * * *